United States Patent
Tamburino

(10) Patent No.: US 7,218,270 B1
(45) Date of Patent: May 15, 2007

(54) ATR TRAJECTORY TRACKING SYSTEM (A-TRACK)

(75) Inventor: Louis A. Tamburino, Kettering, OH (US)

(73) Assignee: The United States of America as represented by the Secretary of the Air Force, Washington, DC (US)

(*) Notice: Subject to any disclaimer, the term of this patent is extended or adjusted under 35 U.S.C. 154(b) by 435 days.

(21) Appl. No.: 10/947,787

(22) Filed: Sep. 17, 2004

Related U.S. Application Data

(63) Continuation-in-part of application No. 10/370,307, filed on Feb. 10, 2003, now abandoned.

(51) Int. Cl.
 *G01S 13/72* (2006.01)
(52) U.S. Cl. .......................... 342/96; 342/90
(58) Field of Classification Search ............. 342/25 R, 342/62, 63, 67, 90, 96, 119; 382/103
 See application file for complete search history.

(56) References Cited

U.S. PATENT DOCUMENTS

| | | | | |
|---|---|---|---|---|
| 5,631,653 A | * | 5/1997 | Reedy | ............... 342/62 |
| 5,631,654 A | * | 5/1997 | Karr | ............... 342/107 |
| 5,794,173 A | * | 8/1998 | Schutte | ............... 701/205 |
| 5,999,651 A | | 12/1999 | Chang et al. | |
| 6,169,817 B1 | | 1/2001 | Parker et al. | |
| 6,243,037 B1 | * | 6/2001 | Pulford et al. | ............... 342/95 |
| 6,404,380 B2 | * | 6/2002 | Poore, Jr. | ............... 342/96 |
| 6,532,191 B2 | * | 3/2003 | LaRosa et al. | ............... 367/124 |
| 6,621,929 B1 | | 9/2003 | Lai et al. | |
| 6,665,440 B1 | | 12/2003 | Zhang et al. | |
| 6,704,692 B1 | | 3/2004 | Banerjee et al. | |
| 2003/0088177 A1 | | 5/2003 | Totterman et al. | |

\* cited by examiner

*Primary Examiner*—Thomas H. Tarcza
*Assistant Examiner*—Isam Alsomiri
(74) *Attorney, Agent, or Firm*—AFMCLO/JAZ; Gerald B. Hollins

(57) ABSTRACT

A-Track is a tracking process that is driven by automatic target recognition techniques (ATR), mobility analysis using digital maps and exploitation of other constraining information. It is structured as an optimization problem amenable to the formalism from classical relaxation labeling algorithm. The novel combination of techniques in A-Track provides a new approach to the temporal problem of establishing and extending target tracks through a sliding time window involving a sequence of multiple data frames. A data frame is a collection of sensor reports taken from one scan of a predetermined surveillance area that is being systematically and repeatedly scanned over time. The relative time differences between reports within a frame are generally much smaller than the time difference between different frames. A-Track is especially designed to handle cases having relatively large time intervals between frames that cause problems for conventional tracking algorithms based on predictive models.

41 Claims, 6 Drawing Sheets

ATR TRAJECTORY TRACKING SYSTEM (A-TRACK)

CROSS REFERENCE TO RELATED APPLICATION

This application is a continuation-in-part of U.S. patent application Ser. No. 10/370,307, filed 10 Feb. 2003 now abandoned, which is hereby incorporated by reference.

RIGHTS OF THE GOVERNMENT

The invention described herein may be manufactured and used by or for the government of the United States for all governmental purposes without the payment of any royalty.

FIELD OF THE INVENTION

The invention relates generally to computerized techniques for processing data obtained from target recognition sensors obtained to track multiple discrete objects.

BACKGROUND OF THE INVENTION

Remote surveillance of airborne and ground vehicles rely upon strategic or theatre-level systems (e.g., satellites, AWACS) for detecting and identifying targets by sensing radiated or reflected electromagnetic energy from target vehicles. Generally, these surveillance systems provide automatic target recognition (ATR) capabilities wherein the multi-spectral and spatial characteristics of each return can identify the type of vehicle. Enhanced range or surveillance or additional spectral bandwidth is often obtained by data fusion, using data from a number of different surveillance platforms.

Once one or more targets of interest have been located and identified, cooperative action may be directed against the targets. The location and characterization of the target of interest is handed off to a tactical platform (e.g., aircraft, missile, directed energy weapon) for action. These tactical platforms require a high-degree of knowledge of current and predicted future location of the target in order to engage. This resolution of tracking is not available from the surveillance platforms. Consequently, a tracking system (e.g., tracking radar system) rapidly scans a narrow aerial volume or surface area about the location received from the surveillance system. The repetition rate of sweeps produces frames of returns that have time difference between respective frames that is relatively short as compared to the mobility of the identified targets. Thus, linking returns between frames is a straightforward matter of linking the most closely spatially related returns between frames. Predicting future locations of the target is made by extrapolating the track of previous returns.

Even with rapid sweep repetitions, the amount of processing required is high. Attempts to increase the number of targets that may be tracked generally requires increasing the time difference between returns, and thus adding a degree of complexity to the predictions required to link returns. For instance, U.S. Pat. No. 5,537,119 to Poore, Jr. is an example of a predictive technique in tracking targets. In particular, Poore, Jr. relies upon an iterative Lagrangian Relaxation technique to link returns between each processed frame in order to assign a track respectively to each target.

While Poore, Jr. provides certain processing advantages over other known preditive techniques, Poore, Jr. shares the general limitation of other predictive techniques in that time differences between frames must still be relatively short as compared to the mobility of the targets. In addition, these predictive techniques presume that each target is present frame to frame in order to maintain a track. Often, returns for a target are not present in a given frame due to factors such as aspects of the target that present a small return, relative velocities, intervening obstructions or atmospheric interference, limitations of the targeting system, etc.

Consequently, a significant need exists for a system and method for tracking that allows larger time intervals between frames and that may more robustly handle tracking when returns are missing in certain frames.

SUMMARY OF THE INVENTION

The present invention addresses these and other problems in the prior art with a method and system that can use Automatic Target Recognition (ATR) techniques, even with large temporal spacing between target reports, to develop a trajectory description output. Moreover, a robust approach is described that accommodates complications associated with large temporal spacing.

In one aspect of the invention, the system and method determines the trajectories of a plurality of periodically sensed targets by iteratively grouping received sensor reports into a frame, linking each report in the frame to a previous frame with an initial assignment vector, converting the linking matrix into a plurality of compatibility matrices, and optimizing an objective function formed from the compatibility matrices such that the assignment vectors converge to a trajectory description output. Thereby, large temporal spacing is accommodated, even with a significant likelihood that any given report may be associated with a plurality of trajectory tracks being monitored.

In another aspect of the invention, optimizing an objective function that is advantageously utilizes a relaxation label algorithm (RLA) loop. In particular, a support function is defined for each compatibility matrix as a weighted average of the respective compatibility matrix with the assignment vector. The weighted sum of the support functions is assembled into an objective function. Then the RLA loop is iteratively performed to optimize the gradient of the objective function, using the updated assignment vector each iteration. Ideally, the RLA loop will converge to a trajectory description output for the plurality of periodically sensed targets.

The marriage of ATR and tracking techniques provides robust tracking in situations where a dedicated tracking system is not available. For example, situations where large volumes of terrain or airspace are being monitored, slow scan rates are being used, and/or many closely spaced targets are being monitored create situations where reports are ambiguous. An "A-track system" is presented that works through the probable assignments of for each report to determine the trajectory tracks represented by the reports.

The accompanying drawings, which are incorporated in and constitute a part of this specification, illustrate embodiments of the invention, and, together with the general description of the invention given above, and the detailed description of the embodiments given below, serve to explain the principles of the present invention.

DETAILED DESCRIPTION OF THE INVENTION

1. Introduction

A-Track is a tracking process that is driven by automatic target recognition techniques (ATR) and structured as an optimization problem amenable to the classical relaxation labeling algorithm. The novel combination of techniques in A-Track provides a new approach to the temporal problem of establishing and extending target tracks through a sliding time window involving a sequence of multiple data frames. A data frame is a collection of sensor reports taken from one scan of a predetermined surveillance area that is being systematically and repeatedly scanned over time. The relative time differences between reports within a frame are generally much smaller than the time difference between different frames. Tracking based on high range resolution radar (HRR) sensor reports from ground targets is the application used to describe the A-Track approach; however, the approach is applicable and extendable for tracking problems based on other sensors.

The 'A' in A-Track emphasizes that it is an ATR-driven tracking method that integrates the information from sensor signatures into the problem of associating reports across different frames. This is especially significant when the time intervals between frames are relatively large; i.e., large enough to cause problems for conventional tracking methods based on predictive models. Over large time intervals, there are no simple choices for selecting dynamic models to predict ground target trajectories. Basic physical constraints and behavioral heuristics are used to establish a set of special matrices that are functions of the given sensor data and available knowledge bases.

Figure 1:
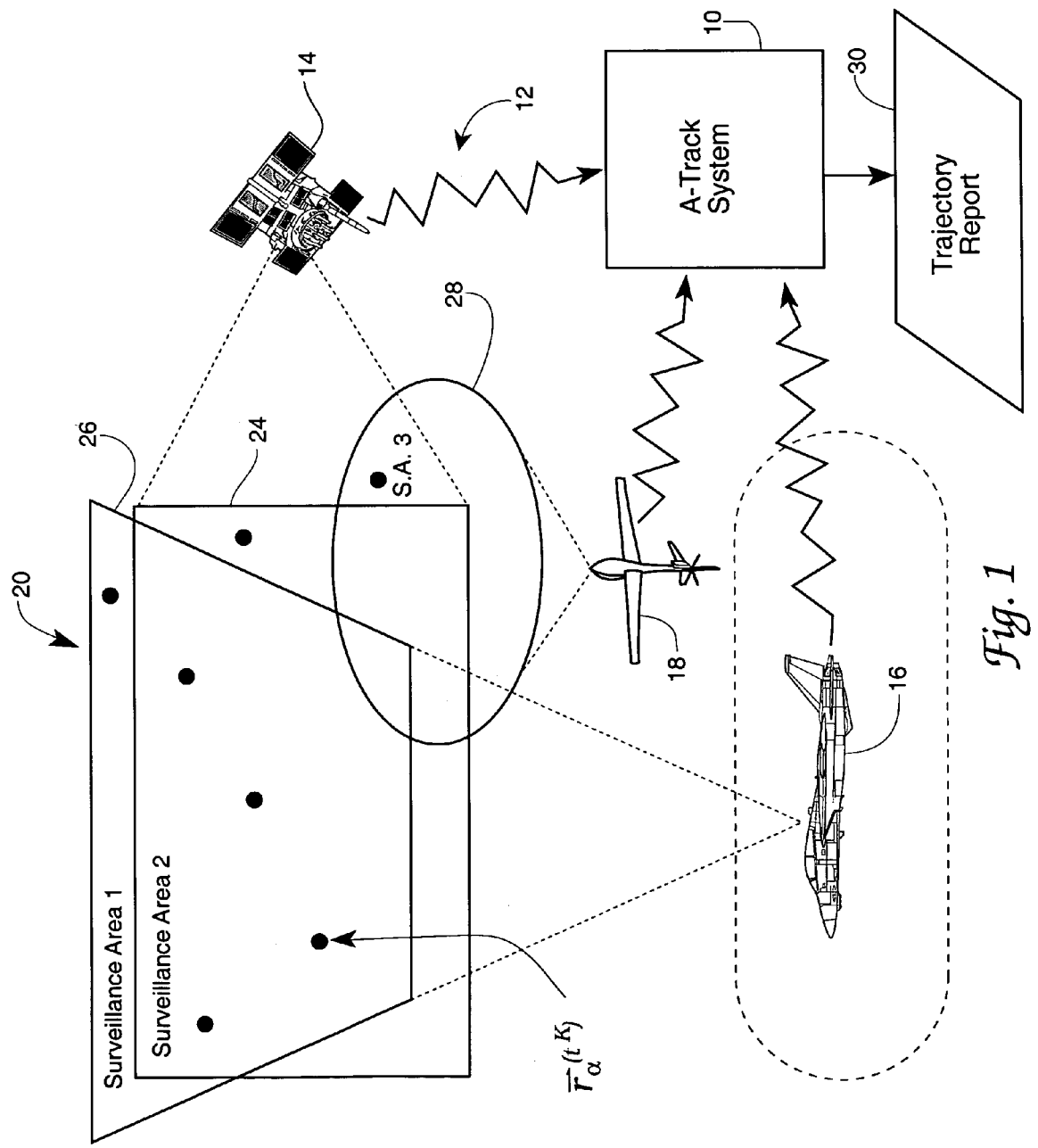
FIG. 1 is a diagram of target reports received from a plurality of surveillance windows within a single time frame.

With reference to FIG. 1, an illustrative depiction of an A-Track system 10 receiving a frame input 12 from a plurality of sensors 14–18, each providing a portion of a plurality of reports 20 from a respective surveillance area 24–28. The A-Track system 10 processes the frame inputs 12 to generate a trajectory report 30.

Figure 2:
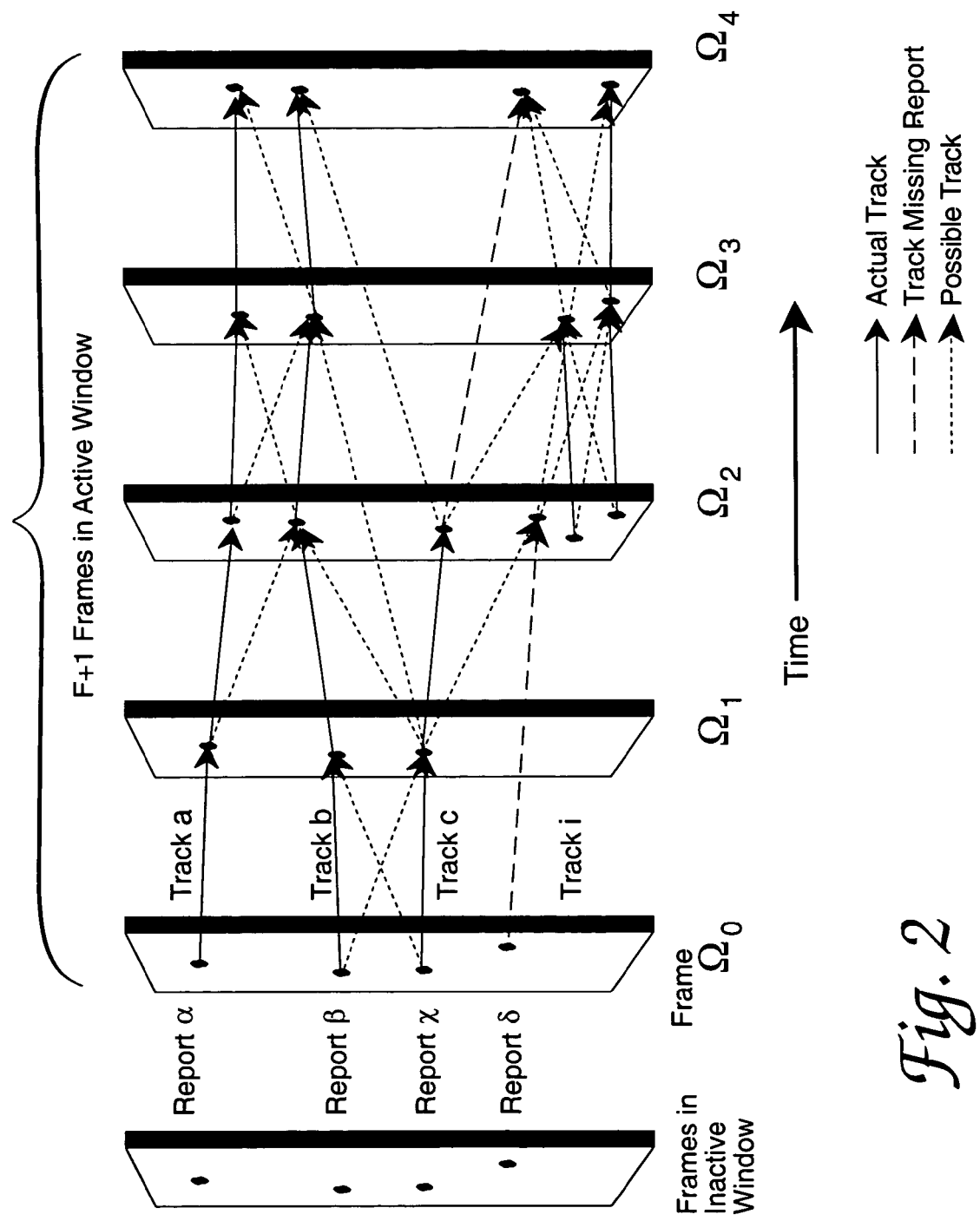
FIG. 2 is a depiction of a plurality of report frames in a sliding time window, with reports forming tracks across subsequent frames.

Analysis used in the A-Track system 10 is based on establishing the relative likelihood of reports $(\alpha,\beta,\chi,\delta)$ in different frames $(\Omega)$, depicted in FIG. 2, being associated with the same target or track index (a, b, c, i). The track solution is specified by a set of distributions that stipulates the relative weights for labeling track segments within a given frame with the sensor report labels associated with that frame. This set of report labels also includes a null label that is associated with missing reports in a frame for some of the target tracks. A-Track employs an enhanced version of the relaxation algorithm to systematically organize and integrate available information into an optimization problem that can be solved with a simplified iterative update rule. The iterative relaxation process takes place in a sliding time window of F+1 frames that contains a fixed number of most recently collected frames. The relaxation algorithm modifies only variables in the active window.

The reports and tracks depicted in FIG. 2 illustrate several problems overcome by the A-track system 10. For example, the time spacing may be large enough between frames that kinematic, predictive techniques are inadequate. The time spacing makes several reports a possible candidate for assigning to a track, as illustrated by the dotted line portions of the tracks that are possible tracks along with the solid line of the actual track that has to be determined.

The reports and tracks depicted in FIG. 2 further illustrate complicating factors that are addressed by the A-track system 10. Occasionally, a report is not received on a target for which a track has been assigned, or a report is sensed for a target for which no track has been previously assigned. The report may be missed due to ATR limitations, such as interference, target aspect angle, masking terrain, or a target that has no relative movement with respect to the sensor or terrain.

Below, a brief overview of standard formalism and conventional notation generally known for relaxation labeling algorithms (RLA) is described under subheading "2. Relaxation Labeling Algorithm". Then, the conventional notation is customized to make it suitable for A-Track under the subheading "3. Modified RLA for A-Track". Here several original theorems are presented to enhance the basic RLA and methods are outlined to deal with a multiplicity of compatibility matrices that facilitate the integration of diversified modeling constraints. The most basic and complex compatibility matrix, which is utilized in multiple ways throughout the A-Track model, is developed in Section 4. Sections 5 and 8 present two additional compatibility matrices that complete the constraint modeling which encompasses the contextual information for the HRR-driven tracking problem. Section 6 addresses the methodology for integrating multiple support functions and Section 7 outlines algorithms for initiating new tracks and removing lost tracks. Section 9 provides a summary of the features incorporated in A-Track.

2. Relaxation Labeling Algorithm

Relaxation labeling algorithms (RLA) are non-linear and parallel iterative procedures introduced by Rosenfeld, Hummel, and Zucker. (Rosenfeld A., R. A. Hummel, and S. W. Zucker, 'Sceen labeling by relaxation operations,' IEE Trans. Syst. Man Cyber., Vol. 6, pp. 420–433, 1976.) Hummel and Zucker introduced a standard theory of consistency in labeling problems that established a connection with mathematical optimization techniques. (R. A. Hummel and S. W. Zucker, 'On the foundation of relaxation labeling processes', IEEE Trans. Pattern Anal. Machine Intell., Vol. 5, pp 267–287, 1983.) Much of the literature is concerned with application of standard techniques and recently Chen and Luh (1995) and Pelillo (1997) have published papers that cover extensions to the theoretical basis established by Hummel and Zucker. (Qin Chen and J. Y. S. Luh, 'Relaxation labeling algorithm for information integration and its convergence', Pattern Recognition, Vol. 28, No. 11, pp. 1705–1722, 1995; M. Pelillo, 'On the dynamics of nonlinear relaxation labeling processes', Journal of Mathematical Imaging and Vision 7, pp. 309–323, 1997, Kluver Academic Publishers.) Some of the early work is summarized by Kittler and Illingworth. [J. Kittler and J. Illingworth, 'Relaxation labeling algorithms—a review', Image Vision Comp., Vol. 3, pp. 206–215, 1985.]

The relaxation labeling process involves a number of entities. There is a set of N objects $b_i \epsilon B$ to be labeled with a set $\lambda = \{1,2,3, \ldots, M\}$ of M labels. In the notation, Roman letters represent indices for objects and Greek letters the indices for labels. Weighted labeling assignments $P_i(\lambda)$ provide a certainty measure for assigning or associating labels $\lambda$ to object $b_i$. Because $P_i(\lambda)$ satisfies the following probability axioms $$0 \leq P_i(\lambda) \leq 1.0, \text{all } i,\lambda, \qquad \text{Eqn. 2.1}$$

$$\sum_{\lambda=1}^{M} P_i(\lambda) = 1.0, \quad i=1,\ldots,N, \qquad \text{Eqn. 2.2}$$

it may be interpreted as a probability. Different authors refer to $P_i(\lambda)$ differently. For example, it is sometimes a certainty vector or a weighting vector. In this paper, $P_i(\lambda)$ is called the assignment vector. The concatenation of assignment vectors for all objects in B is denoted by $P \equiv \vec{P}$ (M×N elements).

The space of assignment vectors consistent with 2.1 and 2.2 is denoted by IK. Every vertex of IK represents an unambiguous labeling assignment and this subspace is denoted by IK*. A labeling P, which is an interior point of IK, is called strictly ambiguous. The iteration index K in $P^K_i(\lambda)$ is generally suppressed in order to simplify notation. The initial distributions may be taken to be a uniform distribution having maximum entropy; i.e., $$P_i^{K=0}(\lambda) = \frac{1}{M}, \qquad \text{Eqn. 2.3}$$

that is suitable if there is no specific information available for making the initial assignment of labels.

A compatibility matrix $R_{ij}(\alpha,\beta)$ is an array of compatibility coefficients or consistency constraints, which are defined in terms of sensor reports and other available intelligence. The compatibility coefficients define the relative influence of object j having label $\beta$ on the assignment of object i with label $\alpha$. For example, $R_{ij}(\alpha,\beta) > R_{ij}(\alpha,\gamma)$ implies that label $\beta$ is more compatible than label $\gamma$ for object j whenever label $\alpha$ is assigned to object i. The goal of the labeling process is to assign labels to each object (i.e., solve for the assignment vectors) in a manner that is consistent with respect to the compatibility constraints. A dependent matrix called the support function is defined by $$S_i(\lambda) = \sum_{j=1}^{N} \sum_{\lambda'=1}^{M} R_{ij}(\lambda,\lambda') P_j(\lambda'). \qquad \text{Eqn. 2.4}$$

Defining the compatibility matrix is a modeling task separate from the task of finding a "consistent" solution for the assignment of labels. The RLA provides one well studied mathematical method for solving for the assignment vector and is based on a non-linear update rule. Historically, we have two different versions of the update rule:

$$P^{K+1}{}_i(\lambda) = \frac{P_i^K(\lambda) \cdot \{1 + S_i^K(\lambda)\}}{1 + \hat{S}^K{}_i}, \qquad \text{Eqn. 2.5}$$

[Rosenfeld, Hummel and Zucker 1971]

-continued $$\text{where } \hat{S}^K{}_i = \sum_{\lambda=1}^{M} P_i^K(\lambda) \cdot S_i(\lambda), \text{ and} \qquad \text{Eqn. 2.6}$$

$$P^{K+1}{}_i(\lambda) = \frac{P_i^K(\lambda) \cdot S_i^K(\lambda)}{\hat{S}_i^K(\lambda)}. \qquad \text{Eqn. 2.7}$$

[S. W. Zucker, Y. G. Leclerc, and J. L. Mohammed, 'Continuous relaxation and local maxima selection: conditions for equivalence', IEEE Trans. Pattern Anal. Mach. Intell., PAMI-3, pp. 117–137, March 1981.]

Note that the normalization insures that the probability axioms 2.1 and 2.2 are satisfied.

The following is a brief review of material relating to the Hummel-Zucker consistency theory that is covered more thoroughly in Pelillo's paper. The relaxation algorithm may be viewed as a continuous mapping of the assignment space onto itself and uses the notation $$P^{K+1} = \Im(P^K), K \geq 0, P \in IK, \qquad \text{Eqn. 2.8}$$

that continues the process until it reaches a fixed or equilibrium point, where $$P^K = \Im(P^K), \text{for some } K, \qquad \text{Eqn. 2.9}$$

and $S_i(\lambda) = c_i$ whenever $P_i(\lambda) > 0$, $i=1,2,\ldots,N, \lambda \in L$ for some nonnegative constants $c_i$.

A weighted labeling assignment $P \in IK$ is said to be consistent if the following N inequalities are satisfied, $$\sum_{\lambda=1}^{M} P_i(\lambda) \cdot S_i(\lambda; \vec{P}) \geq \sum_{\lambda=1}^{M} V_i(\lambda) \cdot S_i(\lambda; \vec{P}) \qquad \text{Eqn. 2.10}$$

$i = 1, 2, \ldots, N$ for all $V$ in $IK$.

If strict inequalities hold in 2.10, then P is said to be strictly consistent.

Theorem [3.1 Pelillo]: A labeling $P \in IK$ is consistent if and only if for all $i=1,2,\ldots,N$ the following conditions hold:

$$S_i(\lambda) = c_i, \text{whenever } P_i(\lambda) > 0 \qquad 1)$$

$$S_i(\lambda) \leq c_i, \text{whenever } P_i(\lambda) = 0 \qquad 2)$$

for some nonnegative constants $c_i$.

Corollary [3.2 Pelillo]: Let $P \in IK$ be consistent. Then P is a fixed point for the nonlinear relaxation operator $\Im$. Moreover, if P is strictly ambiguous the converse also holds.

Hummel and Zucker introduced the average local consistency, defined as $$A(\vec{P}) = \sum_{i=1}^{N} \sum_{\lambda=1}^{M} P_i(\lambda) \cdot S_i(\lambda) \qquad \text{Eqn. 2.11}$$

and proved the following theorem:

Theorem [Hummel-Zucker] If the compatibility matrix R is symmetric; i.e., $R_{ij}(\alpha,\beta) = R_{ji}(\alpha,\beta)$, for all $i,j,\alpha,\beta$, then any local maximum $P \in IK$ of A is consistent.

Note that the inverse of the theorem need not be true.

The requirement for symmetry allows one to relate the gradient of the average local consistency to the support function $$\frac{\partial A(\vec{P})}{\partial p_i(\lambda)} = 2\sum_{j=1}^{N}\sum_{\beta=1}^{M} R_{ij}(\lambda, \beta) \cdot P_j(\beta) = 2S_i(\lambda). \quad \text{Eqn. 2.12}$$

The compatibility matrix need not be restricted to interactions between pairs of labeled objects, but could entail higher order relaxation schemes such as the third order compatibility relations that follow $$S_i(\lambda) = \sum_{j=1}^{N}\sum_{\beta=1}^{M}\sum_{k=1}^{N}\sum_{\gamma=1}^{M} R_{ijk}(\alpha, \beta, \gamma) P_j(\beta) P_k(\gamma). \quad \text{Eqn. 2.13}$$

If the compatibility matrix satisfies the third order symmetry restriction $$R_{ijk}(\alpha,\beta,\gamma)+R_{kij}(\gamma,\alpha,\beta)+R_{jki}(\beta,\gamma,\alpha)=3R_{ijk}(\alpha,\beta,\gamma), \quad \text{Eqn. 2.14}$$

then the gradient satisfies $$\frac{\partial A(\vec{P})}{\partial p_i(\lambda)} = 3S_i(\lambda). \quad \text{Eqn. 2.15}$$

Although an asymmetric compatibility matrix provides no objective function such as $A(\vec{P})$ to be maximized, the relaxation labeling algorithm is still useable. The application of relaxation algorithms to arbitrary compatibility matrices is thoroughly discussed in Pelillo (1997).

Another influence on the RLA formalism used in A-Track comes from Chen and Luh (1995) which presents new formats for the compatibility matrix and a new updating algorithm to replace standard updating equations 2.5 and 2.7. Their format involves the use of a compatibility block matrix of the form $$C = \begin{bmatrix} \underline{C}_{11} & \underline{C}_{12} & \cdots & \underline{C}_{1N} \\ \underline{C}_{21} & \cdots & \cdots & \cdots \\ \cdots & \cdots & \cdots & \cdots \\ \underline{C}_{N1} & \underline{C}_{N2} & \cdots & \underline{C}_{NN} \end{bmatrix} \quad \text{Eqn. 2.16}$$

where $\underline{C}_{ij} \in \mathrm{IR}^{M \times M}$ and $C \in \mathrm{IR}^{MN \times MN}$. Matrices are denoted by underlining or bold script. A neighborhood weight matrix is defined by $$d = \begin{bmatrix} d_{11} & d_{12} & \cdots & d_{1M} \\ d_{21} & \cdots & \cdots & \cdots \\ \cdots & \cdots & \cdots & \cdots \\ d_{M1} & d_{M2} & \cdots & d_{MM} \end{bmatrix} \quad \text{Eqn. 2.17}$$

where $$0 \le d_{ij} \le 1.0 \text{ and } \sum_{j=1}^{M} d_{ij} = 1.0 \text{ for } i, j = 1, 2, \ldots, M. \quad \text{Eqn. 2.18}$$

The support matrix is given by $$\vec{S}_i = \sum_{j=1}^{M} d_{ij} \cdot \underline{C}_{ij} \circ \vec{P}_j. \quad \text{Eqn. 2.19}$$

The new updating formula is $$P_i^{K+1}(\lambda) = P_i^K(\lambda)\{1 + S_i^K(\lambda) - \hat{S}_i^K\} \quad \text{Eqn. 2.20}$$

that is based on the following two conditions on the compatibility coefficients:

$$\sum_{\alpha=1}^{M} C_{ij}(\alpha, \beta) = 1.0 \text{ where} \quad \text{Eqn. 2.21a}$$

$i, j = 1, \ldots, N$ and $\alpha, \beta = 1, \ldots, M$, and $0 \le C_{ij}(\alpha,\beta) \le 1.0.$ \quad Eqn. 2.21b With conditions 2.21, one can verify that $$\sum_{\alpha=1}^{M} S_i(\alpha) = 1.0 \text{ and } 0 \le S_i(\alpha) \le 1.0 \quad \text{Eqn. 2.22}$$

and $$0 \le \hat{S}_i \le 1.0. \quad \text{Eqn. 2.23}$$

Recall equation 2.6, $$\hat{S}_i^K = \sum_{\lambda=1}^{M} P_i^K(\lambda) \cdot S_i^K(\lambda).$$

It can be shown also that $P^{K+1}$ satisfies the probability axioms, equations 2.1 and 2.2, if $P^K$ does. The normalization employed in the other updating formulas (equations 2.5 and 2.7) to insure that $P^{K+1}$ satisfies the probability axioms is no longer required provided the initial vector $P^0$ satisfies the axioms.

To summarize the updating equations with slightly different notation, let $$dP_i^K(\lambda) = P_i^{K+1}(\lambda) - P_i^K(\lambda) \quad \text{Eqn. 2.24}$$

and $$dS_i^K(\lambda) = S_i^K(\lambda) - \hat{S}_i^K. \quad \text{Eqn. 2.25}$$

Then we have $$dP_i^K(\lambda) = P_i^K(\lambda) \cdot ds_i^K(\lambda), \text{[Chen and Luh 1995]} \quad \text{Eqn. 2.26}$$

$$dP_i^K(\lambda) = \frac{P_i^K(\lambda) \cdot dS_i^K(\lambda)}{(1+\hat{S}_i^K)}, \text{ [Rosenfeld, et al. 1978]} \quad \text{Eqn. 2.27}$$

$$dP_i^K(\lambda) = \frac{P_i^K(\lambda) \cdot dS_i^K(\lambda)}{\hat{S}_i^K}. \text{ [Zucker, et al. 1981]} \quad \text{Eqn. 2.28}$$

In the next section, we adopt a modified version of the Chen and Luh update algorithm that differs from the compatibility matrix constraints expressed in equations 2.21a and 2.21b.

3. Modified Relaxation Labeling Algorithm (RLA) for A-Track

Generally known standard relaxation labeling algorithms may be advantageously modified before they can be applied to A-Track 10. In A-Track 10, the objects are tracks denoted by lower case Roman letters. A track conceptually links a group of reports associated with separate frames. Therefore, dual indices are used to specify a specific sensor report: a frame index (capital Greek letter) and a report index (lower case Greek letter) within a frame. The assignment vector $P(i,\Omega,\alpha)$ for the $i^{th}$ track in the $\Omega$-frame gives the relative assignment weights for the $\alpha$-indexed reports in the $\Omega$-frame.

The A-Track system 10 uses both second and third order compatibility matrices:

$$(2^{nd}\ order)R(i,\Omega,\alpha|j,\Gamma,\beta) \qquad \text{Eqn. 3.1}$$

$$(3^{rd}\ order)R(i,\Omega,\alpha|j,\Gamma,\beta|k,\Lambda,\gamma) \qquad \text{Eqn. 3.2}$$

We modified the notation of Section 2 because of the additional frame index needed for labeling; for example, $P(i,\Omega,\alpha)$ is shorthand for $P_{\Omega,i}(\Omega,\alpha)$ and $R(i,\Omega,\alpha|j,\Gamma,\beta)$ for $R_{\Omega,i;\Gamma,j}(\Omega, \alpha;\gamma,\gamma)$. With a little practice, the modified notation becomes easier to read and write. Think of the frame index as shared between the track and report identifiers.

Support function definitions require extra summations over the frame index:

$$S(i, \Omega, \alpha) = \sum_{j=1}^{N} \sum_{\Gamma=0}^{F} \sum_{\beta=0}^{M_\Gamma} R(i, \Omega, \alpha \mid j, \Gamma, \beta) P(j, \Gamma, \beta) \equiv \qquad \text{Eqn. 3.3}$$

$$\sum_{j,\Gamma,\beta} R(i, \Omega, \alpha \mid j, \Gamma, \beta) P(j, \Gamma, \beta) \text{ or}$$

$$S(i, \Omega, \alpha) = \sum_{j,\Gamma,\beta} d_{ij} D_{\Omega\Gamma} R(i, \Omega, \alpha \mid j, \Gamma, \beta) P(j, \Gamma, \beta) \qquad \text{Eqn. 3.4}$$

where the latter version uses dual neighborhood weight matrices which satisfy $$0 \leq d_{ij} \leq 1.0 \text{ and } \sum_{j}^{N} d_{ij} = 1.0 \text{ for } i, j = 1, 2, \ldots, N \qquad \text{Eqn. 3.5}$$

and $$0 \leq D_{\Omega\Gamma} \leq 1.0 \text{ and } \sum_{\Gamma=0}^{F} D_{\Omega\Gamma} = 1.0 \text{ for} \qquad \text{Eqn. 3.6}$$

$$\Omega, \Gamma = 0, 1, 2, \ldots, F.$$

Each frame has $M_\Gamma$ sensor reports denoted by the indices $\{1,2,\ldots,M\Gamma\}$ and a zero label that denotes a missing sensor report in a given frame. A-Track employs two sliding time windows, each of which contains a fixed number of frames. One is an active window in which the assignment vectors are unknown variables. Note that in Equations 3.3 and 3.4, the support function is defined in terms of the F+1 frames in the active window. The second sliding window is associated with historic frames that have most recently passed out of the active window. Assignment vectors in the historic frames are frozen and no longer subject to variation. The incorporation of historic frames in the A-Track model is addressed in Section 4.

In A-Track, the number of objects (tracks) is an unknown and varies over time as old tracks disappear and new tracks are created. In the standard RLA applications, the object and label sets are generally fixed sizes. Here the number of sensor reports associated with each frame is fixed but varies for different frames. The creation and initialization of new tracks are discussed in Section 7. It can be noted here that the creation of a new track does not alter existing coefficients of the compatibility matrices; however, it does require the computation of new coefficients for the new track. In order to simplify this presentation it is assumed that there is at most one report per track in each frame and defer further discussion of the multiple report case to Section 4.

The remainder of this section is devoted to developing the formalism for a new RLA that utilizes Chen and Luh's updating formula in equation 2.20 or 2.26. In the Chen-Luh algorithm, the compatibility matrix must satisfy two constraints. Equation 2.21b requires the compatibility matrix to have a positive dynamic range in the interval [0,1] that insures the invariance of the probability axioms for $P(i,\Omega,\alpha)$.

Constraint 2.21a, which normalizes the compatibility matrix, is necessary to insure that the support function also satisfies the probability axioms. The disadvantage of this normalization is that it removes any symmetry in the compatibility matrix. The new RLA formalism developed for A-Track preserves the simplified update formula without sacrificing symmetry in the compatibility matrix and also facilitates the use of negative coefficients and support functions that depend on a multiplicity of compatibility matrices with mixed orders.

To combine a set of compatibility matrices we take a weighted average of the support functions defined with respect to each compatibility matrix; i.e., $$S(i, \Omega, \alpha) = \sum_{Z} W_Z \cdot S_Z(i, \Omega, \alpha) \text{ where} \qquad \text{Eqn. 3.7}$$

$$S_Z(i, \Omega, \alpha) = \sum_{j,\Gamma,\beta\ldots} R_Z(i, \Omega, \alpha \mid i, \Gamma, \beta \ldots) \cdot P(j, \Gamma, \beta) \ldots \text{ and} \qquad \text{Eqn. 3.8}$$

$$\sum_{Z} W_Z = 1.0. \qquad \text{Eqn. 3.9}$$

The Z index denotes elements in the sets of support functions and compatibility matrices. The average local consistency defined in equation 2.22 is re-defined as $$A(\vec{P}) = \sum_{Z} \sum \sum W_Z \cdot R_Z(i, \Omega, \alpha \mid j, \Gamma, \beta \ldots) \cdot P(i, \Omega, \alpha) \cdot \qquad \text{Eqn. 3.10}$$

$$P(j, \Gamma, \beta) \ldots$$

and is the A-Track objective function to be maximized. If all the compatibility matrices are symmetric, then the gradient has the form $$\frac{\partial A(\vec{P})}{\partial P(i, \Omega, \alpha)} = \sum_{Z} W_Z \cdot O_Z \cdot S_Z(i, \Omega, \alpha), \qquad \text{Eqn. 3.11}$$

where $O_Z$ equals the 'effective' order of the compatibility matrices $R_Z$. The effective order is defined as the number of variable Ps in the objective function (Equation 3.10) which are in the active sliding window. In this paper, $O_Z$ is a positive integer between 1 and 3. Recall that the Ps associated with historic frames are considered fixed parameters or inactive assignment vectors.

The new updating formalism is contained in the following three theorems. The conditions in the first theorem will be assumed in the enhanced RLA used in A-Track.

Theorem 3.1 If given the following three conditions $$-1.0 \leq L^Z_{MIN} \leq R_Z(i,\Omega,\alpha j,\Gamma,\beta \ldots) \leq L^Z_{MAX} \leq 1.0 \text{ for all } Z,i,\Omega,\alpha,j,\Gamma,\beta, \ldots,$$ 
Eqn. 3.12

$$L^Z_{MAX} - L^Z_{MIN} \leq 1.0,$$ 
Eqn. 3.13

$$0 \leq P(i,\Omega,\alpha) \leq 1.0 \text{ and}$$ 
Eqn. 3.14

$$\sum_\alpha P(i,\Omega,\alpha) = 1.0 \text{ (probability axioms)},$$

then the following results are self evident:

$$L^Z_{MIN} \leq S_Z(i,\Omega,\alpha) \leq L^Z_{MAX}$$ 
Eqn. 3.15

$$L^Z_{MIN} \leq \hat{S}_Z(i,\Omega,\alpha) \equiv \sum_\alpha S_Z(i,\Omega,\alpha) \cdot P(i,\Omega,\alpha) \leq L^Z_{MAX}$$ 
Eqn. 3.16

$$-1.0 \leq dS_Z(i,106,\alpha) \equiv S_Z(i,\Omega,\alpha) - \hat{S}_Z(i,\Omega,\alpha) \leq 1.0$$ 
Eqn. 3.17

$$-1.0 \leq dS(i,\Omega,\alpha) \equiv \sum_Z W_Z \cdot dS_Z(i,\Omega,\alpha) \leq 1.0$$ 
Eqn. 3.18 where $$\sum_Z W_Z = 1.0 \text{ and } 0 \leq W_Z \leq 1.0.$$ 
Eqn. 3.19

Proof of these assertions only requires substitution of the limits into the basic definitions. The shorthand notation of this section can be easily converted into the standard notation describe in Section 2 for use in other problems not requiring multiple labeling indices. Similar remarks hold for the remaining theorems in this section.

The second theorem modifies the Chen-Luh RLA by replacing the normalization conditions on the compatibility matrix given by equation 2.21b with conditions 3.12 and 3.13 in Theorem 1 and completely eliminating their normalization constraints on the compatibility coefficients expressed in equation 2.21a.

Theorem 3.2: If the three conditions in Theorem 3.1 are valid and $$dP^K(i,\Omega,\alpha) = P^K(i,\Omega,\alpha) \cdot dS^K(i,\Omega,\alpha) \text{ for all } i,\Omega,\alpha$$ 
Eqn. 3.20 where
K=iteration index, $$S^K(i,\Omega,\alpha) \equiv \sum_Z W_Z \cdot S^K_Z(i,\Omega,\alpha),$$ 
Eqn. 3.21

$$0 \leq W_Z \leq 1, \quad \sum_Z W_Z = 1.0,$$ 
Eqn. 3.22

$$dS^K(i,\Omega,\alpha) \equiv S^K(i,\Omega,\alpha) - \hat{S}^K(i,\Omega) \text{ for all } i,\Omega,\alpha,$$ 
Eqn. 3.23

$$\hat{S}^K(i,\Omega) \equiv \sum_\alpha \sum_Z W_Z \cdot S^K_Z(i,\Omega,\alpha) \cdot P^K(i,\Omega,\alpha) \equiv \sum_\alpha S^K(i,\Omega,\alpha) \cdot P^K(i,\Omega,\alpha),$$ 
Eqn. 3.24 then the simplified update rule 3.20 preserves the probability axioms; i.e., $$0 \leq P^{K+1}(i,\Omega,\alpha) \equiv P^K + dP^K(i,\Omega,\alpha) \leq 1.0$$ 
Eqn. 3.25 and $$\sum_\alpha P^{K+1}(i,\Omega,\alpha) = 1.0.$$ 
Eqn. 3.26

Proof

By definition of $\hat{S}(i,\Omega)$, there is the following identity, $$\sum_\alpha dP^K(i,\Omega,\alpha) \equiv \sum_\alpha P^K(i,\Omega,\alpha) \cdot dS^K(i,\Omega,\alpha) \equiv 0$$ 
Eqn. 3.27 where $$\sum_\alpha dP^K(i,\Omega,\alpha) \equiv \sum_\alpha P^K(i,\Omega,\alpha) \cdot S^K(i,\Omega,\alpha) - \hat{S}^K(i,\Omega) \sum_\alpha P^K(i,\Omega,\alpha) =$$
$$\hat{S}^K(i,\Omega) - \hat{S}^K(i,\Omega) \equiv 0.$$

Equations 3.27 and 3.14 establish equation 3.26. Substitution of equation 3.18 (Theorem 1), $$-1.0 \leq dS^K(i,\Omega,\alpha) \equiv S^K(i,\Omega,\alpha) - \hat{S}^K(i,\Omega) \leq 1.0 \text{ for all } i,\Omega,\alpha,$$ 
Eqn. 3.18 into the update rule 3.20 yields $$-P^K(i,\Omega,\alpha) \leq dP^K(i,\Omega,\alpha) \leq P^K(i,\Omega,\alpha).$$ 
Eqn. 3.28

Hence, $$P^{K+1}(i,\Omega,\alpha) = P^K(i,\Omega,\alpha) + dP^K(i,\Omega,\alpha) \geq 0.$$ 
Eqn. 3.29

The upper limit of equation 3.25 follows immediately from equations 3.26 and 3.29. QED The third theorem gives a specific form for the simplified update algorithm that depends on the gradient of the average local consistency.

Theorem 3.3 If all compatibility matrices are symmetric and satisfy the conditions of Theorem 1 and $$S(i,\Omega,\alpha) = \sum_Z W_Z \cdot S_Z(i,\Omega,\alpha)$$ 
Eqn. 3.30 and the update algorithm $$dP(i,\Omega,\alpha) = P(i,\Omega,\alpha) \cdot dG(i,\Omega,\alpha)$$ 
Eqn. 3.31 is dependent on $G(i,\Omega,\alpha)$ which is proportional to the normalized gradient of the average local consistency $$A(\vec{P}) = \sum_\alpha S(i, \Omega, \alpha) \cdot P(i, \Omega, \alpha) = \quad \text{Eqn. 3.32}$$

$$\sum_Z \sum_\alpha W_Z \cdot S_Z(i, \Omega, \alpha) \cdot P(i, \Omega, \alpha)$$

where $$\frac{\partial A(\vec{P})}{\partial P(i, \Omega, \alpha)} = \quad \text{Eqn. 3.33}$$

$$\sum_Z W_Z \cdot O_Z \cdot S_Z(i, \Omega, \alpha) = G(i, \Omega, \alpha) \cdot \sum_Z W_Z \cdot O_Z,$$

$$dG(i, \Omega, \alpha) = \sum_Z V_Z \cdot S_Z(i, \Omega, \alpha) - \sum_\alpha P(i, \Omega, \alpha) \cdot G(i, \Omega, \alpha) = \quad \text{Eqn. 3.34}$$

$$G(i, \Omega, \alpha) - \hat{G}(i, \Omega),$$

and $$V_Z = \frac{W_Z \cdot O_Z}{\sum_Z W_Z \cdot O_Z}, \quad \text{Eqn. 3.35}$$

then the derivative of $A(\vec{P})$ is positive or zero:

$$dA(\vec{P}) = \sum_{i,\Omega,\alpha} \frac{\partial A(\vec{P})}{\partial P(i, \Omega, \alpha)} \cdot dP(i, \Omega, \alpha) \geq 0.0. \quad \text{Eqn. 3.36}$$

Proof

Substitution of equation 3.33 into equation 3.36 yields $$dA \propto \sum_{i,\Omega,\alpha} G(i, \Omega, \alpha) \cdot dP(i, \Omega, \alpha) = \quad \text{Eqn. 3.37}$$

$$\sum_{i,\Omega,\alpha} G(i, \Omega, \alpha) \cdot P(i, \Omega, \alpha) \cdot dG(i, \Omega, \alpha).$$

Substitution of $G(i,\Omega,\alpha) \equiv \hat{G}(i,\Omega) + dG(i,\Omega,\alpha)$ into equation 3.37 yields $$dA \propto \hat{G}(i, \Omega) \cdot \sum_{i,\Omega,\alpha} P(i, \Omega, \alpha) \cdot dG(i, \Omega, \alpha) + \quad \text{Eqn. 3.38}$$

$$\sum_{i,\Omega,\alpha} dG(i, \Omega, \alpha) \cdot P(i, \Omega, \alpha) \cdot dG(i, \Omega, \alpha)$$

Use of the identity, $$\sum_\alpha dG(i, \Omega, \alpha) \cdot P(i, \Omega, \alpha) \equiv 0.0$$

(see equation 3.27) reduces equation 3.38 to $$dA \propto \sum_{i,\Omega,\alpha} P(i, \Omega, \alpha) \cdot (dG(i, \Omega, \alpha))^2 \geq 0.0, \quad \text{Eqn. 3.39}$$

which is obviously non-negative. QED

4. Basic Compatibility Matrix

4.1 Introduction

Having described the relaxation labeling process, the compatibility matrices are now defined. The objective here is to exploit all physical measurements and other available and pertinent information such as digital map data. The RLA formalism allows one to weight various types of data and to form relative likelihoods or constraints expressed in the compatibility matrix. Often in image processing applications, one compatibility matrix is sufficient to capture the fundamental constraints used in the RLA. However, the HRR A-Track implementation described in the following sections requires more than one compatibility matrix to accomplish this task.

This section defines the basic second order compatibility matrix, $R(i,.\Omega.\alpha|j,\Gamma,\beta)$, which is the most complicated of all the compatibility matrices used in the A-Track HRR model. It is also used in the definition of another third order compatibility matrices in Section 8. This description, while elaborate in scope, is not meant to be the exclusive definition for the basic compatibility matrix, but to serve as an illustrative approach for the A-Track model.

The basic compatibility matrix must satisfy the following constraints:

$R(i,.\Omega.\alpha|j,\Gamma,\beta)=0$ if $i \neq j$, Same-track  Eqn. 4.1

$0 \leq R(j,.\Omega.\alpha \oplus j,\Gamma,\beta) \leq 1.0$, Normalized  Eqn. 4.2

$R(i,.\Omega.\alpha|i,\Gamma,\beta) = R(i,\Gamma,\beta|i,.\Omega.\alpha)$, Symmetric  Eqn. 4.3 where $\Omega_0 \leq \Omega, \Gamma \leq \Omega_0 + F,$  Eqn. 4.4

$F+1$ = number of frames in the active window, $\Omega_0$ = index of oldest frame in the active window.

To reiterate, the basic matrix $R(j,.\Omega.\alpha|j,\Gamma,\beta)$ represents the relative compatibility or influence of association label $\beta$ in frame $\Gamma$ with track j when label $\alpha$ in frame $\Omega$ is associated with the same track index j. Also, as discussed in the previous section, the symmetry constraint insures that the gradient of average local consistency function of $R(i,.\Omega.\alpha|j,\Gamma,\beta)$ will be proportional to the active support function $$V(i, \Omega, \alpha) = \sum_j \delta_{ij} \sum_{\Gamma=\Omega_0}^{\Omega_0+F} D_{\Omega\Gamma} \sum_{\beta=0}^{M_\Gamma} R(i, \Omega, \alpha \mid j, \Gamma, \beta) \cdot P(j, \Gamma, \beta), \quad \text{Eqn. 4.5}$$

where $$\sum_{\Gamma=\Omega_0}^{\Omega_0+F} D_{\Omega\Gamma} = 1.0$$

and $\delta_{ij}$ is the Dirac delta function.

The average local consistency is given by $$J_V = \sum_{i,\Omega,\alpha} V(i, \Omega, \alpha) \cdot (P(i, \Omega, \alpha) \quad \text{Eqn. 4.6}$$

$$= \sum_{i,\Omega,\alpha} \sum_{\Gamma=\Omega_0}^{\Omega_0+F} D_{\Omega\Gamma} \sum_\beta R(i, \Omega, \alpha \mid i, \Gamma, \beta) \cdot P(i, \Gamma, \beta) \cdot P(i, \Omega, \alpha)$$

with the gradient $$\frac{\partial J_v}{\partial P(i, \Omega, \alpha)} = 2 \cdot V(i, \Omega, \alpha). \quad \text{Eqn. 4.7}$$

In contrast to the active support function, a historic version of the support function, $H(i,\Omega,\alpha)$ is introduced in which the basic compatibility matrix links historic frames with an active frame $\Omega$ in the active window:

$$H(i, \Omega, \alpha) = \sum_{j} \delta_{ij} \sum_{\Gamma=\Omega_0-N_H}^{\Omega_0-1} D_{\Omega\Gamma} \sum_{\beta=0}^{M_L} R(i, \Omega, \alpha \mid i, \Gamma, \beta) \cdot P(i, \Gamma, \beta) \quad \text{Eqn. 4.8}$$

where $\Omega_0 \leq \Omega \leq \Omega_0 F$, $\Gamma < \Omega_0$, and $N_H$ is the number of inactive frames Because the $P(i,\Gamma,\beta)$ terms in equation 4.8 are associated with historic frames, they are not active variables and are not subject to change as is $P(i,\Omega,\alpha)$ which is in the active window. Therefore, the gradient corresponding to equation 4.7 is $$\frac{\partial J_H}{\partial P(i, \Lambda, \lambda)} = \frac{\partial \sum_{i,\Omega,\alpha} H(i, \Omega, \alpha) \cdot P(i, \Omega, \alpha)}{\partial P(i, \Lambda, \lambda)} = H(i, \Lambda, \lambda), \quad \text{Eqn. 4.9}$$

which differs by a factor of 2 from the form of equation 4.7.

Figure 3:
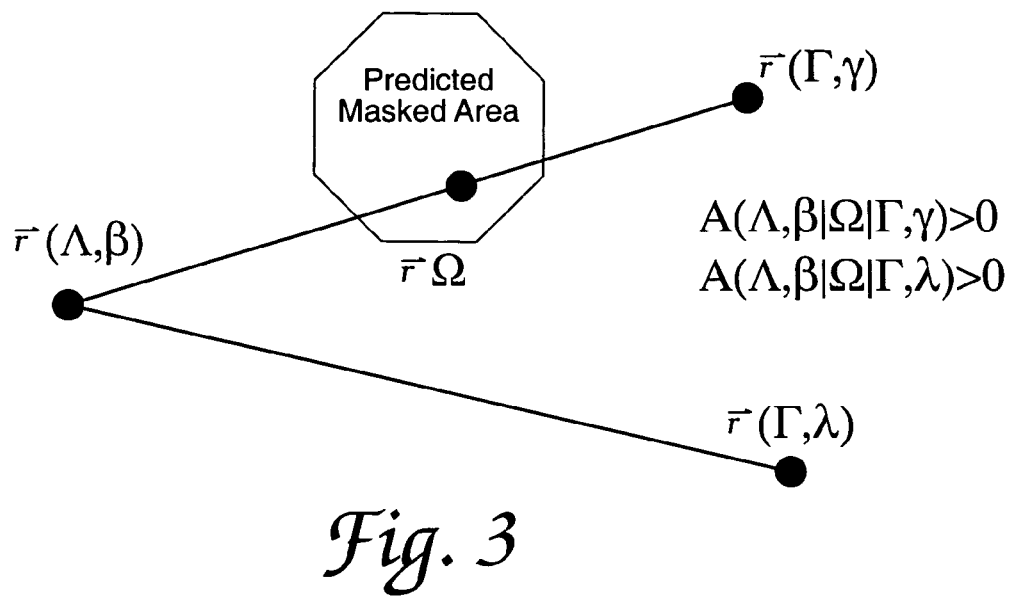
FIG. 3 is a diagram of a missing label determination based on mobility analysis.

The A-Track system 10 depicted in FIG. 3 helps to illustrate how the frame inputs are combined with knowledge bases and converted into track descriptions. The derivation of the basic compatibility matrix is accomplished in two steps; compute a linking matrix and then compute the compatibility matrix. The method for computing the linking matrix depends on the frame rate or time interval between frames. Section 4.2 takes a look at generating the linking matrix under harsh conditions characterized by low frame rates, absence of ATR, and partial knowledge of target state vectors. Section 4.3 introduces the ATR contributions and discusses additional possibilities for constructing components of the linking matrix under more favorable conditions. A co-moving target model is presented in Section 4.4. The conversion of the linking matrix into the compatibility matrix is covered in Section 4.5 and several advanced implementation issues are discussed in Section 4.6.

4.2 Mobility Matrix as a Component of the Linking Matrix

When frames are separated by large time intervals there are many more potential associations between targets than when the frames are close together. Furthermore, it more difficult or unfeasible to use the principal of continuity to estimate target state vectors for large separations. To generate the relative weights between targets in different frames it becomes necessary to exploit techniques that integrate basic ATR constraints derived from the HRR sensor signatures, physical constraints derived from analysis of digital maps, and behavioral heuristics applied to moving vehicles both singly and in groups.

Initially, we concentrate only on those components that deal with two reports in different frames and defer the consideration of components involving missing reports to a later section. Reports are 'observables' which provide physical bases for constructing constraints and relative likelihood measures reflected in matrix form. For the time being, assume $$R(i,.\Omega,\alpha|i,\Omega,\beta)=0 \text{ for all } \alpha \text{ and } \beta, \quad \text{Eqn. 4.10}$$

which rules out multiple frame reports for the same track. Satisfaction of this constraint could result from the sensor hardware or software. Below, the special case where there are multiple target reports in the same frame will be discussed separately as well the case where the report labels $\alpha$ and $\beta$ are zero indicating missing reports in a frame.

Each report $(\Omega,\alpha)$ contains the following minimal sensor data:

Target position $\bar{r}(\Omega,\alpha)$ or $\bar{r}=\rho \cdot \bar{e}_\phi$ or $(\rho,\phi)$ relative to the sensor Radial velocity $\dot{\bar{r}}(\Omega,\alpha)=\dot{\rho}(\Omega,\alpha) \cdot \bar{e}_\phi(\Omega,\alpha)$ High Range Resolution (HRR) radar target signature $\Psi(\Omega,\alpha)$.

In addition to sensor and ATR data, assume that digital maps of the roadways and other environmental features are available. Obtaining this information is part of the preparation for a more extensive compatibility matrix necessary to improve the tracking accuracy. It is very important to know if the targets are moving along roads or off roads and if off road are they moving along pathways that serve as uncharted roads. These uncharted pathways can be learned over time by observation of traffic flow patterns. In general, a target achieves a much greater distance if it moves along a road or a used pathway than it would across open country with rough terrain. A full presentation of this mode of analysis is beyond the scope of this paper. In this discussion, we will refer to the exploitation of this kind of information as mobility analysis.

The first practical step in mobility analysis is to rough out a possibility matrix based on an ultimate velocity limit between any two reports which identifies the subset of possible components to the compatibility matrix. Let $E(\Omega, \alpha|\Lambda,\beta) \in \{0,1\}$, where $E=1$ if a trajectory between two reports is physically possible and $E=0$ otherwise. Next, consider the four possible cases with regards to given pair reports for which $E=1$:

F1=1.0 if on-road to on-road
F1=0.8 if off-road to off-road
F1=0.6 if off-road to on-road or if on-road to off-road The value of factor F1 reflects the relative likelihoods one could assign to each of the given cases. Using the principal of continuity, it would generally be agreed that vehicles on roads would tend to stay on the road, F1=1. Similarly, for the continuity off-road we could assign a value of 0.8 where the value is smaller than 1.0 because being on the road may be more desirable if they are available. The switch between on and off road may be given the smallest value because it is a break in continuity. Note the symmetry between on and off road switching is necessary to maintain the symmetry of the compatibility matrix.

Further use of the continuity principle would lead one to expect a vehicle to travel in the same general direction rather than reverse direction. Both options may be possible, but if one were to assign relative weights it would look something like:

F2=1.0 Target maintains general direction,
F2=0.7 Target reverses direction.

The exact factor assignments are not crucial in defining a compatibility matrix but the correct biases or constraints should be reflected in the values chosen. Those skilled in mobility analysis of a particular environment would assign more realistic values than those selected for illustration.

Finally, the target class would be a major influence in assigning values to the mobility factors under different conditions. For example, the mobility of tanks off-road may far exceed cars whereas on a major road the car may have the greater mobility. The factors F1 and F2 may be combined differently for different target classes. In practice a more extensive set of heuristics and analytic algorithms would be used to assemble a mobility matrix M $(\Omega,\alpha|\Lambda,\beta|c)$, which links two separate reports and is customized to different target classes indexed by c=1,2, . . . ,Nc. If M $(\Omega,\alpha|\Lambda,\beta|c)=0$ for a given class c, then it is impossible to link these two reports for that class. Therefore, after such analysis, if M $(\Omega,\alpha|\Lambda,\beta|c)=0$ for all values of c, then the corresponding components of $E(\Omega,\alpha|\Lambda,\beta)$ must be updated.

Computing of the mobility matrix is one of the most computationally intense tasks in A-Track. This is because all possible trajectories between two given reports must be considered with respect to terrain features and roads over possibly large surveillance areas. More elaborate analysis would require specialized computers to reduce the computation time to match the frame intervals. The military exploitation of map information, which has been underway since the early nineteen seventies, will provide the initial bases for the analytic software needed to compute the mobility matrix.

Perhaps in the future, the use of mathematical morphology on specialized computers could be employed. Here the idea is to use generalized dilation operators that have non-uniform expansion rates in different directions and which adapt to localized features in the digital terrain and road maps. By conditionally initiating a sequence of dilations from the location of a single report, this report can be linked both temporally and spatially to all other reports by the spreading wave front of the dilation process.

4.3 ATR Inputs and the Linking Matrix

The Identification (ID) vector $P(c|\Omega,\alpha)$ for report $(\Omega,\alpha)$ is derived from the target signature by using an ATR algorithm and specifies the relative probability the report is classified by the class index, c=(0), 1, 2, . . . , Nc. The identification vectors come in two flavors depending on whether or not it uses the zero class index $P(0|\Omega,\alpha)$ to specify the relative likelihood of an unknown class. Let the ID vector satisfy the probability axioms, $$\sum_{c}^{N_c} P(c \mid \Omega, \alpha) = 1.0 \text{ and } 0 \le P(c \mid \Omega, \alpha) \le 1.0 \text{ for all } c\text{'s.}$$

The shorthand notation $\overline{P}(\Omega,\alpha)$ for the ID vector is also used.

If more sensor data were available to augment the minimal data set, one could enhance the derived ID vector. In the limit with enough additional sensor data and efficient ATR algorithms, it is possible to not only specify a target class but to label individual targets within the same class. Obviously this kind of identification would greatly simplify the tracking problem. In this discussion, it is assumed that target ID's are imperfect at best, including the case where a target may be in an unknown class. It should be noted that it is not necessary to have complete certainty about the target ID vector for it to be a useful constraint in the matching and linking of different reports in the RLA.

The application of ATR algorithms to the HRR signature will now be factored into the development of the basic linking matrix. Later, a derived ID vector $P(c|\Omega,\alpha)$ will be used to convert the linking matrix into a compatibility matrix. HRR signatures are very sensitive to the pose of the target relative to the sensor, so in general, it is not possible to use the following correlation measure directly between the signatures in different frames separated by a large time interval;

$$0 \le C(\Omega, \alpha \mid \Gamma, \beta) \equiv \frac{\Psi(\Omega, \alpha) \cdot \Psi(\Gamma, \beta)}{|\Psi(\Omega, \alpha)| \cdot |\Psi(\Gamma, \beta)|} \le 1.0. \qquad \text{Eqn. 4.11}$$

ATR template matching algorithms utilizes a similar correlation measure between the measured signature and reference signatures for sets of classes and poses $(\Theta)$:

$$0 \le C(\Omega, \alpha; c, \Theta) \equiv \frac{\Psi_{Meas}(\Omega, \alpha) \cdot \Psi_{Ref}(\Omega, \alpha; c, \Theta)}{|\Psi_{Meas}(\Omega, \alpha)| \cdot |\Psi_{Ref}(\Omega, \alpha; c, \Theta)|} \le 1.0 \qquad \text{Eqn. 4.12}$$

In the HRR template matching algorithms, the maximum correlation value over all orientations $$C(\Omega,\alpha;c,\Theta_{MAX})=\text{MAX}_{\Theta}[C(\Omega,\alpha;c,\Theta)], \qquad \text{Eqn. 4.13}$$

generates the ID vector and also estimates the target pose $\Lambda_{MAX}$. It is even possible to generate an ID vector with a zero ('other') component; see Mitchell and Westerkamp (1999) for one approach applied to HRR signatures. [Mitchell, Richard A. and John J. Westerkamp, 'Robust Statistical Feature Based Aircraft Identification', IEEE Transactions on Aerospace and Electronic Systems, Vol. 35, No. 3, 1999.] Knowing the target pose can be utilized to generate dynamic constraints and target velocity vectors. Recall that target orientation together with the measured radial velocity component provides an estimate of the instantaneous velocity vector. Additional pose information can be used to help confirm or improve the target ID and to improve the definitions of co-moving target model describe below.

The main purpose of this section is to demonstrate how ATR information is incorporated into A-Track. Subsequently, several ATR factors will be defined that could be use with the mobility matrix to formulate a linking matrix. The first factor is a dot product of two ID vectors, which is a very general construct. It has the advantage of being invariant over pose variation. One difficulty with matching two different ID vectors is how to handle the unknown class component (c=0) since this component can represent anything different from one of the given classes (c>0). In this discussion, we assign only partial credit to the matching of the unknown 'zero' component. If one thinks of the ID vectors as a probability distribution, then probability associated with matching two ID vectors is the customized dot product (•) between them:

$$\overline{P}(\Omega, \alpha) \bullet \overline{P}(\Lambda, \beta) = \sum_{c=0}^{N_c} \{1 - v \cdot \delta(c)\} \cdot P(c \mid \Omega, \alpha) \cdot P(c \mid \Lambda, \beta), \qquad \text{Eqn. 4.14}$$

$$\text{Prob}\{ID(\Omega,\alpha)=c \text{ and } ID(\Lambda,\beta)=c\} \equiv P(c|\Omega,\alpha) \cdot P(c|\Lambda,\beta)$$
for c>0, 　　　　　　　Eqn. 4.15

$$\text{Prob}\{ID(\Omega,\alpha)=0 \text{ and } ID(\Lambda,\beta)=0\} \equiv \{1-v\} \cdot P(0|\Omega,\alpha) \cdot P(0|\Lambda,\beta) \text{ for } c=0, \qquad \text{Eqn. 4.16}$$

where $\delta(c)$ is the Dirac delta function ($\delta(c)=1$ if c=0 and =0 otherwise) and $0<v<1$. Combining the matching coefficients and mobility matrix, we define a linking matrix:

$$L(\Omega,\alpha|\Lambda,\beta|c)=M(\Omega,\alpha|\Lambda,\beta|c) \cdot \{\overline{P}(\Omega,\alpha) \bullet \overline{P}(\Lambda,\beta)\}, \qquad \text{Eqn. 4.17}$$

where $0 \le L \le 1.0$.

If a template matching algorithm is used, then the product of maximizing correlations, via equation 4.12 and 4.13, defines the following linking factor:

$$0 \leq U(\Omega,\alpha;\Gamma,\beta|c,\Theta_{MAX}) = \hat{C}(\Omega,\alpha;c,\Theta_{MAX}) \leq 1.0, \qquad \text{Eqn. 4.18}$$

which can be used in place of the product of ID vectors $\overline{P}(\Omega,\alpha) \cdot \overline{P}(\Lambda,\beta)$, i.e., $$L(\Omega,\alpha|\Gamma,\beta|c) = M(\Omega,\alpha|\Gamma,\beta|c) \cdot U(\Omega,\alpha;\Lambda,\beta|c,\Theta_{MAX}). \qquad \text{Eqn. 4.19}$$

In the limit that two frames are very close together, a good assumption is that target pose is similar in both frames. If the pose relative to the moving sensor platform is the same in both frames, one can use direct correlation between the two raw signatures as defined in equation 4.11 to derive a good similarity measure independent of class labels c. However, the pose relative to a moving sensor may not be invariant even though a target's orientation is constant in a fixed coordinate system. In the fixed coordinate system, the constant pose estimate is made by computing the average velocity vector between the two reports. These pose estimates are then converted into a specific orientations $\Theta_{spec.}$ in the sensor's coordinate system and then used to generate an HRR reference signatures $\Psi_{Ref}$ ($\Theta_{Spec.}$, c) which are correlated with measured signatures via equation 4.12. The product of corresponding correlation measures from two frames define the following linking factor:

$$V(\Omega,\alpha;\Gamma,\beta|c) = \hat{C}(\Omega,\alpha;c,\Theta_{\alpha\text{-}Spec.}) \cdot \hat{C}(\Gamma,\beta;c,\Theta_{\beta\text{-}Spec.}). \qquad \text{Eqn. 4.20}$$

The specific pose values, $\Theta_{Spec.}$, differentiate the product in 4.20 from the product in equation 4.18 which utilizes poses, $\Theta_{MAX}$, associated with maximizing templates in the database.

In the limit that three frames are very close together, then one can compute the average velocities between reports in adjacent frames and use these velocities to project (forward and backwards) the position of reports in the middle frame into the other two frames. The predicted extended locations are compared with the measured positions in the two frames to derive a similarity measure. In general the measure would be some function of the separation between predicted $\bar{r}(\Omega;\Gamma,\beta)$ and measured $\bar{r}(\Omega,\alpha)$ locations; for example, $$D(\Omega,\alpha;\Gamma,\beta) = k \cdot \exp\{(\bar{r}(\Omega;\Gamma,\beta) - \vec{r}(\Omega,\alpha))^2/\sigma^2\}. \qquad \text{Eqn. 4.21}$$

This factor is not derived from ATR considerations; but uses a kinematic approximation to generate relative linking likelihoods. Notice that the D matrix is similar to a predictive filtering technique, which is independent of the class label c. This factor can be used to enhance the definition of the linking matrix or it can be use as a substitute factor for the mobility matrix. In the case of high frame rates, it would simplify computation to substitute the D matrix for the mobility matrix.

Several different components, U, V, D (equations 4-18, 4-20, 4.21) have been defined that could be used to redefine the linking matrix defined in equation 4.17. For example, for high frame rates, it would be more convenient to use V and D in the following definition:

$$L(\Omega,\alpha|\Gamma,\beta|c) = D(\Omega,\alpha|\Gamma,\beta) \cdot V(\Omega,\alpha;\Gamma,\beta|c,\Theta_{\alpha\text{-}Spec.},\Theta_{\beta\text{-}Spec.}).$$

Also, if the pose relative to the sensor can be assumed to be the same in the two closely spaced frames, then the direct correlation factors, equation 4.11, could be the linking matrix components, $$L(\Omega,\alpha|\Gamma,\beta) = C(\Omega,\alpha|\Gamma,\beta), \qquad \text{Eqn. 4.23}$$

In examples 4.22 and 4.23, the information that would be provided by mobility analysis is compensated for by higher frame rates. As frame separations increase, it becomes necessary to replace these two factors with an alternatives. Establishing the linking matrix between widely separated frames will depend heavily on the use of mobility analysis. However, it may be prudent to have several levels of mobility analysis to use for different frame separations. In this vein the D matrix would be at the lowest level. When mobility analysis is unfeasible or resources limited, the linking matrix definition must rely solely on one of the ATR factors discussed above.

It should be appreciated that different definitions of the linking matrix, dynamic models, and different ATR algorithms for generating the ID vector may be used consistent with the present invention. For instance, different modes of computing the linking matrix are illustrated herein, which provides a good deal of flexibility in formulating an HRR tracking problem.

4.4 Co-Moving Target Model

There is one final enhancement to the linking matrix that depends on the continuity of groups of co-moving targets. The concept is that a set of targets moving together in one frame should tend to continue moving together in adjacent frames. We shall take a given report located off-road at $\bar{r}(\Omega,\alpha)$ and define a neighborhood set of co-moving reports by the following conditions:

$$|\bar{r}(\Omega,\alpha) - \bar{r}(\Omega,\beta)| \leq \delta, \qquad \text{Eqn. 4.24a}$$

$$|\dot{\rho}(\Omega,\alpha) - \dot{\rho}(\Omega,\beta)| \leq \epsilon. \qquad \text{Eqn. 4.24b}$$

The on-road conditions are 4.24a and the same speed tangent to the road:

$$\left| \frac{\dot{r}(\Omega,\alpha)}{\bar{e}_\phi(\Omega,\alpha) \cdot \bar{e}_{ROAD\_\alpha}} - \frac{\dot{r}(\Omega,\beta)}{\bar{e}_\phi(\Omega,\beta) \cdot \bar{e}_{ROAD\_\beta}} \right| \leq \varepsilon, \qquad \text{Eqn. 4.24c}$$

where the unit vector $\bar{e}_{ROAD\_X}$ is tangent to the road at report X.

The analysis of co-moving targets is closely related to the problem of distinguishing multiple target reports in the same frame. Because the time differences between reports in the same frame are relatively small, the constraints of closeness and matching speeds are similar to constraints 4.24. Recall constraint 4.10, which assumed that the problem of multiple hits per frame has been eliminated elsewhere. This is a general problem for all tracking systems and a full discussion of its solution is beyond the scoop of this paper. While leaving this subject, we point out that the correlation factor in equation 4.11 may be used to tag two reports as belonging to different targets:

$$C(\Omega,\alpha|\Omega,\beta) \leq \text{threshold} \Longrightarrow \text{different targets}.$$

Let $\eta(\Omega,\alpha|\Omega,\beta) = 1$ if $\beta\epsilon$ co-moving neighborhood of $\alpha$=0 otherwise Eqn. 4.25a $$\eta(\Omega,\alpha) = \sum_\beta \eta(\Omega,\alpha|\Omega,\beta) = \alpha\text{-neighborhood size}. \qquad \text{Eqn. 4.25b}$$

Define the average ID for the $\alpha$-neighborhood as $$\hat{P}(C|\Omega,\alpha) = \sum_{\beta,\beta \neq \alpha} \frac{\eta(\Omega,\alpha|\Omega,\beta) \cdot P(C|\Omega,\beta)}{\eta(\Omega,\alpha)} \text{ if } \eta(\Omega,\alpha) > 0, C = 1, 2, \ldots, N_c \qquad \text{Eqn. 4.26}$$

$$= 0 \text{ if } \eta(\Omega,\alpha) = 0$$

and the following linking functions:

$$A(\Omega,\alpha|\Gamma,\beta) \equiv \exp\{-\{\eta(\Omega,\alpha)-\eta(\Gamma,\beta)\}^2/\sigma^2\} \equiv \exp\{-\Delta\eta(\Omega,\alpha|\Gamma,\beta^2)/\sigma^2\},$$

Eqn. 4.27

$$B(\Omega, \alpha \mid \Gamma, \beta) \equiv$$

Eqn. 4.28

$$\sum_c \hat{P}(C \mid \Omega, \alpha) \cdot \hat{P}(C \mid \Gamma, \beta) \cdot (1 - \nu \cdot \delta(C)) \equiv \hat{P}(\Omega, \alpha) \bullet \hat{P}(\Gamma, \beta),$$

$$N(\Omega,\alpha|\Gamma,\beta) = \{\omega 1 + \omega 2 \cdot \delta(\eta(\Gamma,\beta))\} \cdot A(\Omega,\alpha|\Gamma,\beta) + \omega 2 \cdot B(\Omega, \alpha|\Gamma,\beta),$$

Eqn. 4.29 where the positive weights satisfy $\omega 1 + \omega 2 = 1.0$ and $\delta(X)$ is the delta function. Notice that $A(\Omega,\alpha|\Gamma,\beta)$ is independent of the ATR derived ID vector and is a function of the mismatch between the different sizes of co-moving neighborhoods. $B(\Omega,\alpha|\Gamma,\beta)$ is a function of the ID vectors and equal to zero if the size of either of the two neighborhoods is equal to zero. The co-moving neighborhood function $N(\Omega,\alpha|\Gamma,\beta)$ combines the two linking functions and takes into account the case of null neighborhoods.

The co-moving neighborhood linking function is used to enhance the linking matrix defined by equation 4.12. Let the enhanced definition be given by $$L(\Omega,\alpha|\Lambda,\beta|C) \equiv W(\Omega,\alpha|\Lambda,\beta) \cdot N(\Omega,\alpha|\Lambda,\beta) \cdot M(\Omega,\alpha|\Lambda,\beta|C)$$

Eqn. 4.30a or the alternative definition, which uses a weighted sum $$L(\Omega,\alpha|\Lambda,\beta|C) \equiv \{v1 \cdot W(\Omega,\alpha|\Lambda,\beta) + v2 \cdot N(\Omega,\alpha|\Lambda,\beta)\} \cdot M(\Omega,\alpha|\Lambda,\beta|C)$$

Eqn. 4.30b where $$0 \leq L(M(\Omega,\alpha|\Lambda,\beta,C)) \leq 1.0$$

Eqn. 4.31 and the positive weights satisfy, $v1+v2=1.0$.

4.5 Converting the Linking Matrix into a Compatibility Matrix

To covert a linking matrix into the basic compatibility matrix, we need to define a conditional probability distribution, $P(C|j)$, over target classes (C) given the track index (j). Initially each unique track label (n) is anchored to a specific report (A,K) so it picks up the ID vector of the anchoring report to define the required distribution $$P(c|n) \equiv P(c|\kappa,k).$$

Eqn. 4.32

It should also be noted that the new track (n) has an invariant label weighting distribution in the anchoring frame $\Lambda$ $$P(n|\Lambda,\alpha) = \delta_{\alpha k},$$

Eqn. 4.33 where $\delta_{\alpha k}$ is the Dirac delta function.

The conversion to the compatibility matrix is accomplished by using $P(c|j)$ to take a weighted average over the linking matrix, $$R(j, \Omega, \alpha \mid j, \Lambda, \beta) \equiv \sum_{c=0}^{N_c} L(\Omega, \alpha \mid \Lambda, \beta \mid c) \cdot P(c \mid j) \text{ for } \alpha, \beta > 0.$$

Eqn. 4.34

The remaining components for the basic compatibility matrix involve missing report labels ($\alpha$ or $\beta = 0$). These components are the most difficult to define because constraints between missing reports and measured reports cannot be related to mobility analysis or ID vectors. An adaptive control definition for these components will be deferred until the other compatibility matrices are defined because it couples all null labeled support functions.

4.6 Advanced Implementation Issues

Before concluding this section, it should be noted that for applications with large numbers of tracks, the compatibility matrix requires large amounts of storage capacity. For a thousand targets, the basic compatibility matrix has on the order of a billion components. In order to reduce memory requirements, it is more efficient to store the linking matrix and use equation 4.34 to compute the coefficients as needed. For a thousand track problem, the storage requirements would be several orders of magnitude smaller.

The second implementation note also concerns equation 4.34 and is a speculative suggestion for a new adaptive mechanism for future experimentation. After the initial phase of the relaxation process, as the tracks become less ambiguous, each track may develop a set D of dominant labels in each frame called anchors. One definition for a dominant report for track j is given by:

If $P(j,\Omega,\delta) > \tau$, then report $(\Omega,\delta)$ is an anchor for track j. Eqn. 4.35

If $\tau > 0.5$ then there is only one dominant report for each track in each frame; however, the same report can dominate two different tracks. In order to eliminate this ambiguity, we will design a negative compatibility matrix in Section 5 to introduce competition between tracks for the same report. Using the anchor set, one can define a weighted average ID vector over the set D:

$$\langle P(c \mid j) \rangle = \frac{\sum_{\Omega,\alpha \in D} P(j, \Omega, \alpha) \cdot P(c \mid \Omega, \alpha)}{\sum_{\Omega,\alpha \in D} P(j, \Omega, \alpha)}.$$

Eqn. 4.36

The average $<P(c|j)>$ can be substituted for the anchor value of $P(c|j) = P(c|\Omega_0,\lambda_0)$ in equation 4.34 that converts the linking matrix into the compatibility matrix:

$$R(j, \Omega, \alpha \mid j, \Lambda, \beta) \equiv$$

Eqn. 4.37

$$\sum_{c=0}^{N_c} L(\Omega, \alpha \mid \Lambda, \beta \mid c) \cdot \langle P(c \mid j) \rangle \text{ for } \alpha, \beta > 0.$$

This adaptive process introduces the concept of using track formation to improve the ID vector which in turn modifies the compatibility matrix which then influences further track definition and so forth. For large applications in which one stores the linking matrix, this approach would require little additional computation.

5. Negative Compatibility Matrix (Lateral Inhibition)

The function of the negative compatibility matrix is to provide a competitive pressure in the relaxation process that drives the labeling weight distribution to delta functions. In competitive neural networks this process is called lateral inhibition or winner-take-all strategy. The idea is that if a certain report $(\Omega,\alpha)$ has a large value of $P(j,\Omega,\alpha)$ it will tend to suppress the weight associated with other reports having smaller components ($P(i,\Omega,\alpha) < P(j,\Omega,\alpha)$) so that $P(j,\Omega,\alpha)$ increases at the expense of $P(i,\Omega,\alpha)$ for all $i \neq j$. The negative compatibility matrix (denoted by $\overline{R}$) is quite simple compared to the basic matrix discussed in the previous section, $$\bar{R}(i, \Omega, \alpha \mid j, \Gamma, \beta) \equiv -\frac{(1-\delta_{ij})}{(M_\Omega - 1)} \cdot \delta_{\Omega\Gamma} \cdot \delta_{\alpha\beta}. \qquad \text{Eqn. 5.1}$$

Note that $\bar{R}$ satisfies $$-1 \leq \frac{-1}{(M_\Omega - 1)} \leq \bar{R}(i, \Omega, \alpha \mid j, \Gamma, \beta) \leq 0,$$

which is a necessary condition for theorems 3.1, 3.2, 3.3. This is true even if the normalizing parameter $(M_\Omega - 1)$ were not included in the definition.

The corresponding support function is given by $$N(i, \Omega, \alpha) \equiv \sum_{j,\Gamma,\beta} \bar{R}(i, \Omega, \alpha \mid j, \Gamma, \beta) \cdot \qquad \text{Eqn. 5.2a}$$

$$P(j, \Gamma, \beta) \cdot - \sum_{j=1}^{M_\Omega} \frac{(1-\delta_{ij})}{(M_\Omega - 1)} \cdot P(j, \Omega, \alpha).$$

$$N(i, \Omega, \alpha) \equiv -\frac{(\tilde{P}(\Omega, \alpha) - P(i, \Omega, \alpha))}{(M_\Omega - 1)} \text{ where}$$

$$\sum_{i=1}^{M_\Omega} N(i, \Omega, \alpha) = -\sum_{i=1}^{M_\Omega} P(i, \Omega, \alpha) \equiv -\tilde{P}(\Omega, \alpha) \text{ and} \qquad \text{Eqn. 5.3}$$

$$\sum_{\alpha=1}^{N_\Omega} N(i, \Omega, \alpha) = -1.0. \qquad \text{Eqn. 5.4}$$

For use in the next section, define $$\hat{N}(i, \Omega) \equiv \sum_{\alpha=0}^{N_\Omega} P(i, \Omega, \alpha) \cdot N(i, \Omega, \alpha) = \qquad \text{Eqn. 5.5}$$

$$-\sum_{\alpha=0}^{N_\Omega} P(i, \Omega, \alpha) \cdot \frac{(\tilde{P}(\Omega, \alpha) - P(i, \Omega, \alpha))}{(M_\Omega - 1)}.$$

All non-zero values of the support function are negative which tends to weaken the corresponding component of the assignment vector. Since the stronger components of the assignment vectors incur less negative support components they come out better in the competition based on the negative compatibility matrix.

6. Combining Support Functions

Combining the three different support functions from above, we obtain a weighted sum $$S(i,\Omega,\alpha)=W_1 \cdot H(i,\Omega,\alpha)+W_2 \cdot V(i,\Omega,\alpha)+W_3 N(i,\Omega,\alpha), \qquad \text{Eqn. 6.1}$$

where $$\sum_{Z=1}^{3} W_Z = 1.0$$

and $0 \leq W_Z \leq 1.0$.

Since the basic and negative compatibility matrices satisfy the conditions of theorem 3.1 and are explicitly symmetric, we can apply the theorems 3.1, 3.2, and 3.3 and use the gradient of the average local consistency $$G(i, \Omega, \alpha) = \qquad \text{Eqn. 6.2}$$

$$\frac{\partial A(\bar{P})}{\partial P(i, \Omega, \alpha)} = \sum_{z=1}^{3} O_Z \cdot W_Z \cdot S_Z(i, \Omega, \alpha) = O_1 \cdot W_1 \cdot H(i, \Omega, \alpha) +$$

$$O_2 \cdot W_2 \cdot V(i, \Omega, \alpha) + O_3 \cdot W_3 \cdot N(i, \Omega, \alpha)$$

where $O_1=1$ and $O_2=O_3=2$, to define the update rule:

$$dP(i,\Omega,\alpha)=P(i,\Omega,\alpha) \cdot dG(i,\Omega,\alpha) \qquad \text{Eqn. 6.3}$$

where $$dG(i,\Omega,\alpha)=G(i,\Omega,\alpha)-\hat{G}(i,\Omega), \qquad \text{Eqn. 6.4}$$

$$dG(i,\Omega,\alpha)=W_1 \cdot dH(i,\Omega,\alpha)+2 \cdot W_2 \cdot dV(i,\Omega,\alpha)+2 \cdot W_3 \cdot dN(i,\Omega,\alpha), \qquad \text{Eqn. 6.5}$$

and $$\hat{G}(i, \Omega) = \sum_{\alpha=1}^{N_\Omega} P(i, \Omega, \alpha) \cdot G(i, \Omega, \alpha) = \qquad \text{Eqn. 6.6}$$

$$W_1 \cdot \hat{H}(i, \Omega) + 2 \cdot W_2 \cdot \hat{V}(i, \Omega) + 2 \cdot W_3 \cdot \hat{N}(i, \Omega).$$

The reason that $O_1=1$ is the definition of the local average consistency $A(P)$ spans the historic window in which the label assignment vectors are treated as constants when computing the gradient.

We now present several useful theorems based on the update rule 6.3.

Theorem 6.1

Relationship $P(j,Q\Omega,\alpha)=\delta_{\alpha\beta}$ is invariant under update rule 6.3.

Proof If $P^K(j,\Omega,\alpha)=\delta_{\alpha\beta}$, then $$\hat{G}(j, \Omega) = \sum_{\alpha=1}^{N_\Omega} P^K(j, \Omega, \alpha) \cdot G^K(j, \Omega, \alpha) = G^K(j, \Omega, \beta)$$

$$dG^K(j,\Omega,\alpha) \equiv (1-\delta_{\alpha\beta})G^K(j,\Omega,\alpha).$$

Substitution of dG into the update rule results in the following identity $$dP^K(j,\Omega,\alpha)=P^K(j,\Omega,\alpha) \cdot dG^K(j,\Omega,\alpha)=\delta_{\alpha\beta} \cdot (1-\delta_{\alpha\beta}) \cdot G^K(j,\Omega,\alpha)=0 \text{ for all } \alpha.$$

Hence $P^{K+1}(j,\Omega,\alpha)=P^K(j,\Omega,\alpha)=\delta_{\alpha\beta}$. QED

Theorem 6.2

Relationship $P(j,\Omega,\alpha)=0$ for some $\alpha$ is invariant under update rule 6.3.

Proof: By definition, $$d P^K(j,\Omega,\alpha)=P^K(j,\Omega,\alpha) \cdot dG^K(j,\Omega,\alpha)=0 \text{ if } P^K(j,\Omega,\alpha)=0.$$
$$\text{Hence } P^{K+1}(j,\Omega,\alpha)=P^K(j,\Omega,\alpha)=0. QED$$

In order to complete the formalism depending on the basic compatibility matrix, we now define the components of the basic matrix that have missing report labels (zero labels). Let $$0 \leq R(i,\Omega,0|i,\gamma,\beta)=R(i,\Gamma,\beta|i,\Omega,0)=C_\Omega \leq 1.0, \text{ for all } \Omega,\Gamma, i,\beta \qquad \text{Eqn. 6.7}$$

so that active and historic support functions become $$V(i,\Omega,0)=C_\Omega \text{ or } H(i,\Omega,0)=C_\Omega, \qquad \text{Eqn. 6.8}$$

where $C_\Omega$ is a variable parameter to be defined. The constraint $0 \leq C_\Omega \leq 1.0$ is required by equation 4.2. There is ambiguity in zero—zero components $R(i,\Omega,0|i,\Gamma,0)$ that could equal $C_\Omega$ or $C_\Gamma$ by the definition 6.7. However, equations 6.8 are the more fundamental assumptions in our model. Note, definition 6.7 is unambiguous for computing the support functions $V(i,\Omega,\alpha)$ and $H(i,\Omega,\alpha)$ when $\alpha > 0$.

The zero component of the gradient of the average local consistency function (see definition 6.2) is $$G(i,\Omega,0) = W_1 \cdot H(i,\Omega,0) + 2 \cdot W_2 \cdot V(i,\Omega,0) + 2 \cdot W_3 \cdot N(i,\Omega,0),$$

$$G(i,\Omega,0) = (W_1 + 2 \cdot W_2) \cdot C_\Omega + 2 \cdot W_3 \cdot N(i,\Omega,0). \quad \text{Eqn. 6.9}$$

Summing over the track index $i$ and noting equation 5.3 we obtain $$\sum_{i=1}^{M_\Omega} G(i, \Omega, 0) \equiv \tilde{G}(\Omega, 0) = \quad \text{Eqn. 6.10}$$

$$(W_1 + 2 \cdot W_2) \cdot M_\Omega \cdot C_\Omega - 2 \cdot W_3 \cdot \tilde{P}(\Omega, 0).$$

Intuitively, one can interpret $\tilde{P}(\Omega,0)/M_\Omega$ as the probability of a missing report in frame $\Omega$. For the purpose of defining $C_\Omega$, an ideal value for this probability based on the difference between the number of active tracks and measured reports is estimated. Let the ideal value of the missing report probability be given by $$\wp = \frac{1 + \max(M_\Omega - N_\Omega, 0)}{M_\Omega} > 0. \quad \text{Eqn. 6.11}$$

Generally there should be more tracks than reports in a frame, $M_\Omega \geq N_\Omega$, otherwise one should generate new tracks. Let the value of $C_\Omega$ be proportional to the ideal probability, which increases the missing report components of the compatibility matrix as the disparity between the number of tracks and reports increases:

$$C_\Omega = \frac{2 \cdot W_3 \cdot \wp}{(W_1 + 2 \cdot W_2)} > 0, \quad \text{Eqn. 6.12}$$

where $C_\Omega$ must also be less than 1.0. Substituting $C_\Omega$ into equation 6.10 yields $$\frac{\tilde{G}(\Omega, 0)}{M_\Omega} = 2 \cdot W_3 \cdot \left( \wp - \frac{\tilde{P}(\Omega, 0)}{M_\Omega} \right), \text{ where} \quad \text{Eqn. 6.13}$$

$$\tilde{P}(\Omega, 0) \equiv \sum_{i=1}^{M_\Omega} P(i, \Omega, 0) \text{ and}$$

$$\tilde{G}(\Omega, 0) \equiv \sum_{i=1}^{M_\Omega} G(i, \Omega, 0).$$

Equation 6.13 relates the zero component averages of the gradient vector and the assignment vector:

$$\tilde{G}(\Omega,0)/M_\Omega > 0 \text{ if } \tilde{P}(\Omega,0)/M_\Omega < \wp,$$

$$\tilde{G}(\Omega,0)/M_\Omega < 0 \text{ if } \tilde{P}(\Omega,0)/M_\Omega > \wp. \quad \text{Eqn. 6.14}$$

Equation 6.13 demonstrates that the definition of $C_\Omega$ is equivalent to a control mechanism that tries to balance the estimated probability of missing reports with the ideal probability dependent on the number of tracks and thereby influence the labeling distribution weights $P(i,\Omega,0)$ associated with missing reports. This control mechanism is a desirable feature for modeling the difficult phenomenon of missing reports.

7. Initiating and Removing Tracks

The numbers of reports in each frame fluctuate for a variety of reasons. Those causing missing reports include the following: (1) targets stop or have radial velocities relative to sensor which make them invisible, (2) targets leaving area of surveillance, (3) terrain occlusion (predictable) and other random masking of radar signals, and (4) sensor artifacts. Reasons that cause new target reports include: targets starting to move, entering the surveillance area, or emerging from a masking area. Also clutter or noise produces false target reports. These fluctuations present additional difficulties for track association problems such as the procedures for establishing estimates for missing reports discussed in the previous section. Means must be provided to adaptively adjust the number of tracks whose number cannot be predetermined because of the above factors. Since the mathematical theory of RLA generally addresses problems in which the number of objects and labels are fixed, A-Track needed to explore new facets of the theory and provide a novel method for generating new tracks within the RLA model.

In the initial frame $\Theta$, each sensor report is a unique target and is assigned to a new track label, $M_\Theta = N_\Theta$. Each of the label weight distributions is equal to a delta function $$P(i,\Theta,j) = \delta_{ij}, \quad \text{Eqn. 7.1}$$

where the number of track and report indices are equal in the initial frame. These initial assignments are invariant under the RLA update rules as shown in theorem 6.1.

In frames other than the initial frame, A-Track uses the following procedure for generating and establishing a new track.

Criteria for Generating a New Track:

Certainly the condition, $N_\Omega > M_\Omega$, of having more reports than tracks requires one to generate new tracks as mentioned above. If one or more new tracks have to be generated, one needs methods for anchoring each new track.

1. At any time, if $$\tilde{P}(\Omega, \lambda) \equiv \sum_{j=1}^{M_\Omega} P(j, \Omega, \lambda) < \varepsilon, \quad \text{Eqn. 7.2}$$

then a new track, with index $I_{NEW}$, may be anchored to report $(\Omega,\lambda)$:

$P(I_{NEW},\Omega,\alpha) = \delta_{\alpha\lambda}$ and the ID vector $P(C|I_{NEW}) \equiv P(C|\Omega,\lambda)$.

2. If a new track needs be generated and anchored to a report because $N_\Omega > M_\Omega$, select that report corresponding to $\min_\alpha(\tilde{P}(\Omega,\alpha))$.

Criteria 1 and 2 assert that the selected anchoring report $(\Omega,\lambda)$ is least strongly associated with any track in the frame and therefore the appropriate candidate for establishing a new track.

After anchoring the new track to the candidate report $(\Omega,\lambda)$, one has the task of establishing values for $R(I_{NEW},\Gamma,\beta|I_{NEW},\Omega,\lambda)$ and $P(I_{NEW},\Gamma,\alpha)$ for all $\Gamma \neq \Omega$. The required components of the compatibility matrix are computed as discussed in Section 4. No modification of the existing components are necessary to accommodate new tracks. The rule adopted in A-Track for initializing the distributions for the new track in all active windows is $$R(I_{NEW}, \Gamma, 0 | I_{NEW}, \Omega, \lambda) = C_\Omega \qquad \text{Eqn. 7.3}$$

$$P(I_{NEW}, \Gamma, \beta) \equiv \frac{R(I_{NEW}, \Gamma, \beta | I_{NEW}, \Omega, \lambda)}{\sum_{\beta=0}^{N_\Gamma} R(I_{NEW}, \Gamma, \beta | I_{NEW}, \Omega, \lambda)} \geq 0 \qquad \text{Eqn. 7.4}$$

where $C_\Omega$ is defined in Section 6 (see Equation 6.12). This formula initializes and normalizes the assignment vector for all reachable reports. Recall that any component initialized with a value of zero will always retain this value. Thus all components of reachable reports are given a competitive chance with a weight proportional to the magnitude of the new compatibility matrix.

Criteria for Track Removal:

A sequence of a fixed number of missing reports is a common criterion for track removal in other tracking algorithms. The following is another simple criterion for dropping tracks from the active set of tracks:

$$C_M = \frac{\sum_{\Omega=0}^{N_F} P(i, \Omega, 0)}{N_F + 1} \geq \mu \qquad \text{Eqn. 7.5}$$

where $0 \leq C_M \leq 1.0$ is a normalized missing report ratio and $\mu$ is a threshold value for track removal.

The number of non-ambiguous labels defined by $$N(i) = \sum_\Omega \sum_{\alpha=1}^{M_\Omega} h(P(i, \Omega, \alpha) - 1 + \varepsilon) \geq \tau, \qquad \text{Eqn. 7.6}$$

where $h(x)=1$ if $x \geq 0$ and $=0$ otherwise and $\epsilon$ is a small parameter, can also be used to determine the activity of a track index. The criterion is If $N(i) \geq \tau \Longrightarrow$ active track. \qquad Eqn. 7.7

A sequence of missing sensor reports for a given track may be interpreted in different ways. It could be a target that has stopped or exited the surveillance area or the track index could have been associated with a noisy report that is difficult to link with other reports in adjacent frames. This distinction may have useful intelligence value; however, it can be difficult to make. Such distinctions could be based on the pattern of missing reports. If, following the initialization of a track, one observes a series of strong links to observable reports in adjacent frames followed by a number of missing reports then one would assign a higher likelihood of the track being a real target that has stopped or traveled away from the surveillance area. Without an initial sequence of strong non-missing weights to verify the tracks authenticity, one tends to interpret the track as a noisy artifact. A large value of $N(i)$ initially can be used to establish a confidence measure for a track index being associated with a real target.

8. Third Order Compatibility Matrix

Thus far, the A-Track model does not exploit all the information one may obtain from digital maps. For example, a digital terrain map allows one to predict areas where one can expect to find missing reports. A digital map with environmental data would also allow one to forecast areas with higher densities of false reports. This section illustrates how to use a third order compatibility matrix to exploit knowledge of predictable areas of sensor masking.

The A-Track masking model considers a triplet of report labels associated with the same track index in three separate frames. This triplet consists of a missing report temporally sandwiched between two observable reports. This model requires a third order compatibility matrix related to the masking support function by the following:

$$M(i, \Omega, \alpha) = \sum_{\Lambda, \Gamma} D_{\Omega \Lambda \Gamma} \sum_{\beta, \gamma} R(i, \Omega, \alpha | i, \Lambda, \beta | i, \Gamma, \gamma) \cdot P(i, \Lambda, \gamma) \cdot P(i, \Gamma, \gamma) \qquad \text{Eqn. 8.1}$$

where $$0 \leq R(i, \Omega, \alpha | i, \Lambda, \beta | i, \Gamma, \gamma) \leq 1.0, \qquad \text{Eqn. 8.2}$$

$$D_{\Omega \Lambda \Gamma} \equiv \overline{\delta}_{\Omega \Lambda} \cdot \overline{\delta}_{\Omega \Gamma} \cdot \overline{\delta}_{\Lambda \Gamma} \equiv \frac{(1 - \delta_{\Omega \Lambda}) \cdot (1 - \delta_{\Omega \Gamma}) \cdot (1 - \delta_{\Lambda \Gamma})}{F \cdot (F - 1)},$$

$$\sum_{\Lambda=0}^{F} \sum_{\Gamma=0}^{F} D_{\Omega \Lambda \Gamma} = 1.0,$$

$\overline{\delta}_{XY} = 1 - \delta_{XY}$ and $\delta_{XY}$ is the Dirac delta function. There should be no confusion between $0 \leq M(i, \Omega, \alpha) \leq 1.0$ and the parameter $M_\Omega$ which equals the number of tracks in frame $\Omega$. The average local consistency for the compatibility matrix is $$J_M = \sum_{i, \Omega, \alpha} M(i, \Omega, \alpha) \cdot P(i, \Omega, \alpha) \qquad \text{Eqn. 8.3}$$

or $$J_M = \sum_{i, \Omega, \alpha} \sum_{j, \Lambda, \beta} \sum_{k, \Gamma, \gamma} \delta_{ij} \cdot \delta_{ik} \cdot \delta_{jk} \cdot D_{\Omega \Lambda \Gamma} \cdot R(i, \Omega, \alpha | j, \Lambda, \beta | k, \Gamma, \gamma) \cdot$$
$$P(i, \Omega, \alpha) \cdot (P(j, \Lambda, \beta) \cdot P(k, \Gamma, \gamma).$$

The gradient is given by $$\frac{\partial J_M}{\partial P(i, \Omega, \alpha)} = \qquad \text{Eqn. 8.4}$$

$$\sum_{\Lambda, \beta} \sum_{\Gamma, \gamma} D_{\Omega \Lambda \Gamma} \cdot P(i, \Lambda, \beta) \cdot P(i, \Gamma, \gamma) \cdot \{R(i, \Omega, \alpha | i, \Lambda, \beta | i, \Gamma, \gamma) +$$
$$R(i, \Lambda, \beta | i, \Omega, \alpha | i, \Gamma, \gamma) + R(i, \Gamma, \gamma | i, \Lambda, \beta | i, \Omega, \alpha)\}.$$

We define the compatibility matrix by the following:

$$R(i, \Omega, \alpha | i, \Lambda, \beta | i, \Gamma, \gamma) = T(\Omega, \Lambda, \Gamma)) + T(\Gamma, \Omega, \Lambda) + T(\Lambda, \Gamma, \Omega) \qquad \text{Eqn. 8.5}$$

where $T(\Omega \Lambda \Gamma) = T(i, \Omega, \alpha | \Lambda^\circ i, \Gamma, \gamma) = \overline{\delta}_{\alpha 0} \cdot \delta_{\beta 0} \cdot$
$\overline{\delta}_{\gamma 0} \cdot A(\Omega, \alpha | \Lambda \Gamma, \gamma) \cdot B(\Omega, \Lambda, \Gamma) \cdot R(i, \Omega, \alpha | i, \Lambda, \gamma),$ $T(\Gamma \Omega \Lambda) = T(i, \Gamma, \gamma | \Omega i, \Lambda, \beta) = \delta_{\gamma 0} \cdot \delta_{\alpha 0}$
$\overline{\delta}_{\beta 0} \cdot A(\Gamma, \gamma | \Omega | \Lambda, \beta) \cdot B(\Gamma, \Omega, \Lambda) \cdot R(i, \Gamma, \gamma | i, \Lambda, \beta),$ $T(\Lambda \Gamma \Omega) = T(i, \Lambda, \beta | \Gamma i, \Omega, \alpha) = \delta_{\beta 0} \cdot \delta_{\epsilon 0} \cdot$
$\overline{\delta}_{\alpha 0} \cdot A(\Lambda, \beta | \Gamma | \Omega, \alpha) \cdot B(\Lambda, \Gamma, \Omega) \cdot R(i, \Lambda, \beta | i, \Omega, \alpha),$ $B(\Omega, \Lambda, \Gamma) = H(\Lambda - \Omega) \cdot H(\Gamma - \Lambda)$, and $H(x) = 1$ if $x > 0$, $= 0$ otherwise.

In the definition of function B, arguments of H are arithmetic differences of frame indices. The function B(Ω, Λ,Γ) imposes the constraints that the three frame indices are different and that the characteristic time of each frame increases from left to right. The product of three delta functions are non-zero only when the middle frame is associated with a missing report label and the other two frames with observable reports (labels>0). The inclusion of the basic compatibility matrix term serves two functions. It is zero if the two observable reports are not connectable. Otherwise, it gives a relative likelihood that the observable reports are connected by track i.

Figure 4:
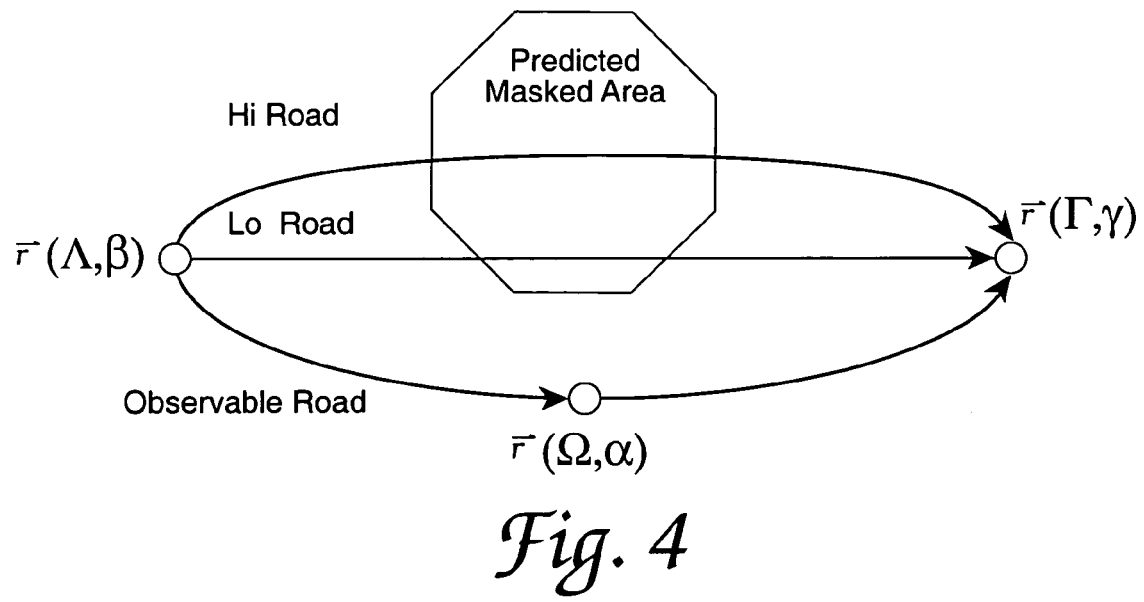
FIG. 4 is a diagram of determining a probability of an observed report based on mobility analysis.

The remaining factor, $0 \leq A(\Omega,\alpha|\Lambda|\Gamma.\beta) \leq 1.0$, is related to the predicted masking areas. To evaluate this function one needs to estimate the location of the missing report in the middle frame and determine whether or not it lies within a predicted masking area. If the missing report's estimated location is within the predicted masking area, then A is assigned a positive value and if not it is assigned a zero value (See FIG. 4). Hence, the T functions and ultimately the third order compatibility matrix will only be non-zero for those conditions that sandwich a known masking area between two connectable observations.

Mobility analysis may be used to estimate a missing report position from the two observable reports conditioned on them being connectable. The simplest estimate for the position of the missing report is to assume a straight-line trajectory between the observable reports:

$$\bar{r}(\Lambda) \approx \bar{r}(\Omega, \alpha) + \frac{\tilde{t}(\Lambda) - t(\Omega, \alpha)}{t(\Gamma, \beta) - t(\Omega, \alpha)} \cdot \{\bar{r}(\Gamma, \gamma) - \bar{r}(\Omega, \alpha)\} \quad \text{Eqn. 8.7}$$

where $\tilde{\tau}(\Lambda)$ is a time characteristic of the Λ frame. If the missing report region is large, then even this rough estimate may be good enough to establish non-zero constraint values for $A(\Omega,\alpha|\Lambda|\Gamma.\beta)$; i.e., If $\bar{r}(\Lambda) \in$ Masked Region, then $A=1$; $A=0$ otherwise. Eqn. 8.8

This simplified algorithm can be replaced to achieve better estimates. For example, the straight-line trajectory assumption in 8.7 needs to be changed to accommodate on-road trajectories for curving roads. Also, mobility analysis can determine multiple possible trajectories between the two anchoring reports with some fraction going through the predicted masking area in the mid-frame and others missing it. Possible trajectories missing the masking areas are identified by the following constraint on the basic compatibility matrices $$R(i,\Omega,\alpha|i,\Lambda,\beta) \cdot R(i,\Lambda,\beta|i,\Gamma,\gamma) > 0, \quad \text{Eqn. 8.9}$$

where (Λ,β) is a linking observable report in the mid-frame. The magnitude of $A(\Omega,\alpha|\Lambda|\Gamma.\beta)$ is inversely proportional to the number of linking reports satisfying this constraint 8.8 (see FIG. 5). Elaboration of an algorithm for computing A is beyond the scope of this discussion; however, it is easy to appreciate that it would be computed as a by-product of the module that does the mobility analysis.

The gradient of the average local consistency is given by $$\frac{\partial J_M}{\partial P(i, \Omega, \alpha)} = \sum_{\Lambda,\beta} \sum_{\Gamma,\gamma} D(\Omega\Lambda\Gamma) \cdot P(i, \Lambda, \beta) \cdot P(i, \Gamma, \gamma) \cdot \quad \text{Eqn. 8.9}$$

$$\{T(\Omega\Lambda\Gamma) + T(\Gamma\Omega\Lambda) + T(\Lambda\Gamma\Omega) + T(\Lambda\Omega\Gamma) + T(\Gamma\Lambda\Omega) +$$
$$T(\Omega\Gamma\Lambda) + T(\Gamma\Lambda\Omega) + T(\Omega\Gamma\Lambda) + T(\Lambda\Omega\Gamma)\}$$

or $$\frac{\partial J_M}{\partial P(i, \Omega, \alpha)} = \sum_{\Lambda,\beta} \sum_{\Gamma,\gamma} D(\Omega\Lambda\Gamma) \cdot P(i, \Lambda, \beta) \cdot$$

$$P(i, \Gamma, \gamma) \cdot \{T(\Omega\Lambda\Gamma) + 2 \cdot T(\Omega\Gamma\Lambda) + T(\Gamma\Omega\Lambda) + 2 \cdot T(\Lambda\Omega\Gamma) + T(\Lambda\Gamma\Omega) + 2 \cdot T(\Gamma\Lambda\Omega)\}.$$

Because of the symmetric product $P(i,\Lambda,\beta) \cdot P(i,\Gamma,\gamma)$ in the summation, one can interchange the dummy indices sets (Λ,β) and (Γ,γ) so that $$\frac{\partial J_M}{\partial P(i, \Omega, \alpha)} = 3 \cdot \sum_{\Lambda,\beta} \sum_{\Gamma,\gamma} D(\Omega\Lambda\Gamma) \cdot P(i, \Lambda, \beta) \cdot \quad \text{Eqn. 8.10}$$

$$P(1, \Gamma, \gamma) \cdot \{T(\Omega\Lambda\Gamma) + T(\Gamma\Omega\Lambda) + T(\Lambda\Gamma\Omega)\}.$$

Substituting definition 8.5 into equation 8.10, shows that the gradient is three times the support function:

$$\frac{\partial J_M}{\partial P(i, \Omega, \alpha)} = 3 \cdot \sum_{\Lambda,\beta} \sum_{\Gamma,\gamma} D(\Omega\Lambda\Gamma) \cdot P(i, \Lambda, \beta) \cdot P(i, \Gamma, \gamma) \cdot \quad \text{Eqn. 8.11}$$

$$R(i, \Omega, \alpha|i, \Lambda, \beta|i, \Gamma, \gamma)$$

$$= 3 \cdot M(i, \Omega, \alpha).$$

The compatibility matrix as defined by equation 8.5 does not satisfy the 'explicit' symmetry constraint defined by equation 2.14; however, it has 'implicit' symmetry which also yields the format of equation 8.11. The definition of the $3^{rd}$ order compatibility matrix can be modified to have explicit symmetry but this is not necessary since the implicit symmetry is sufficient and more efficient. Recall that having the symmetry, explicitly or implicitly, simplifies the computation of the gradient of the average local consistency used in the RLA updating equation 3.23.

The equations for combining support functions given in Section 6 need to be modified to include an additional function $M(i,\Omega,\alpha)$. Some of the modifications necessary to define the total gradient are given in the following summary:

$$G(i, \Omega, \alpha) = \frac{\partial A(\bar{P})}{\partial P(i, \Omega, \alpha)} = \sum_{z=1}^{4} O_Z \cdot W_Z \cdot S_Z(i, \Omega, \alpha), \quad \text{Eqn. 6.2a}$$

$$= W_1 \cdot H(i, \Omega, \alpha) + 2 \cdot W_2 \cdot V(i, \Omega, \alpha) +$$
$$2 \cdot W_3 \cdot N(i, \Omega, \alpha) + 3 \cdot W_4 \cdot M(i, \Omega, \alpha),$$

$$dP(i,\Omega,\alpha) = P(i,\Omega,\alpha) \cdot dG(i,\Omega,\alpha), \quad \text{Eqn. 6.3}$$

$$dG(i,\Omega,\alpha) = G(i,\Omega,\alpha) - \hat{G}(i,\Omega), \quad \text{Eqn. 6.4}$$

$$dG(i,\Omega) = W_1 \cdot dH(i,\Omega,\alpha) + 2 \cdot W_2 \cdot dV(i,\Omega,\alpha) + 2 \cdot W_3 \cdot dN(i,\Omega, \alpha) + 3 \cdot W_4 \cdot dM(i,\Omega,\alpha), \quad \text{Eqn. 6.5a}$$

$$\tilde{G}(i, \Omega) = \sum_{\alpha=1}^{N_\Omega} P(i, \Omega, \alpha) \cdot G(i, \Omega, \alpha) = W_1 \cdot \hat{H}(i, \Omega) +$$
$$2 \cdot W_2 \cdot \hat{V}(i, \Omega) + 2 \cdot W_3 \cdot \hat{N}(i, \Omega) + 3 \cdot W_4 \cdot \hat{M}(i, \Omega).$$

Eqn. 6.6a

The modification to equations 6.13 is $$\frac{\tilde{G}(\Omega, 0)}{M_\Omega} = W_3 \cdot \left( \tilde{\wp} - \frac{\tilde{P}(\Omega, 0)}{M_\Omega} \right) + 3 \cdot W_4 \cdot \frac{\tilde{M}(\Omega, 0)}{M_\Omega},$$

Eqn. 6.13 where the additional support function satisfies $$0 \le M(i, \Omega, 0) \le 1.0 \text{ and } 0 \le$$

Eqn. 8.12

$$\frac{\tilde{M}(\Omega, 0)}{M_\Omega} \equiv \frac{\sum_{i=1}^{M_\Omega} M(i, \Omega, 0)}{M_\Omega} \le 1.0.$$

9. Operation of A-Track

By virtue of the foregoing, A-Track represents a new method for the development of tracking algorithms and is characterized by the use of formalism from relaxation labeling algorithms and flexibility for modeling diversified operational conditions. It may be driven by ATR algorithms and mobility analysis. The HRR problem used to illustrate this flexibility demonstrates how different modalities can accommodate data collection with wide variation in the temporal separation of frames. For large separation, the number of possible links increases and places greater demands on the association problem. This problem is complicated further by sensor artifacts, missing reports, and targets leaving and entering the surveillance area. In order to make correct associations as entropy increases, more of the available knowledge needs to be exploited.

The use of compatibility matrices as defined in relaxation labeling theory is shown to be a convenient and easily adaptable formalism to model and integrate ATR inputs with mobility analysis. In order to facilitate modeling of the HRR application it has been necessary to enhance the standard RLA outlined in Section 2. A number of new theorems are presented in Section 3 that serve as the bases for several improvements. First, new theorems are presented which demonstrate that by limiting the dynamic range of the compatibility matrix without sacrificing its symmetry, one can utilize the Chen-Luh simplified update rule. Maintaining the symmetric properties simplifies computation of the gradient of the average local consistency, which is shown to be greater than or equal to zero, thus insuring local convergence of the model's objective function. Also, these new algorithms facilitate the integration of four different support functions derived from three different compatibility matrices defined in the A-Track HRR model. This set of symmetric matrices has different dynamic ranges and generates different support functions with different orders. In the resulting formalism, the gradient of the objective function equals a weighted average of the four support functions.

Ideally invariant features should be used as ATR inputs into the linking matrices computation; however, in general, no invariant HRR features are known, other than the target ID vector. Recall that HRR signatures are very sensitive to changes in target and sensor orientation. The ID vector, which is a generic output of ATR algorithms, can be easily integrated into the computation of the linking matrices. HRR signature templates were discussed from the standpoint of generating signature correlation measures and pose estimation. Not included in this A-Track model are sensors other than HRR, such as ELINT, which provide pose invariant features that correlate over large time intervals.

Mobility analysis is mainly concerned with using physical constraints to establish relative likelihoods for possible connections between pairs of observed reports. The basic compatibility matrix for the HRR model presented in Section 4 demonstrates how to combine mobility analysis with ATR input for widely separated frames and how to use predictive filtering between closely separated frames. Coefficients in this second order matrix link two observed sensor reports. Conceptually more difficult to define are the coefficients associated with missing reports. A solution is given in Section 6 in which all the missing report coefficients in a frame are assigned the same parametric value. These parameters act as control variables that are adjusted each iterative cycle in a manner that effects a balance between the number of tracks and number of reports in each frame. The basic matrix defines a second order active support function linking only frames in the active sliding window and a first order historic support function that links one active frame and recent frames in an adjacent inactive window.

In order to promote competition between report labels for each of the tracks, a second compatibility matrix with negative coefficients was presented in Section 5. This competition tends to eliminate the ambiguous case where several different tracks are all assigned large assignment weights corresponding to the same report. Recall that the sum of assignment weights for the same report across all tracks is not normalized as is the sum over alpha index in the assignment vector $P(i,\Omega,\alpha)$. Derived from basic and negative compatibility matrices are three support functions whose unification is discussed in Section 6.

Algorithms for deleting old tracks and for generating and initializing new tracks are given in Section 7. In most RLA applications the number of objects and labels are fixed parameters. The number of tracks needed is a variable of the optimization process and varies as new frames are added. Also the number of report labels varies from frame to frame. In this formalism the addition of a new track does not effect previous computations. With each new track the corresponding linking matrices are computed between the new track anchored to a specific report and all other frames. This in turn is used to initialize the assignment weights for the new track in all other frames in the active window. Also discussed are methods for determining which disappearing tracks are real and which are noisy artifacts.

An additional compatibility matrix is presented in Section 8 in order to exploit knowledge of predicted masking areas not included in the basic matrix. This enhancement demonstrates that capturing additional constraints may require a new compatibility matrix rather than modification of factors in an existing matrix. This new case required a third order compatibility matrix to span three different frames. In designing the masking model, the third order matrix utilized the second order basic matrix as a multiplicative factor in its definition. The third order matrix has implicit symmetry rather than the explicit symmetry generally discussed in the literature. It is shown that implicit symmetry is efficient while allowing the gradient to be proportional to the support function. At the end of Section 8, the methodology for combining the fourth support function with the three previous support functions is given.

10. Implementation

Figure 5:
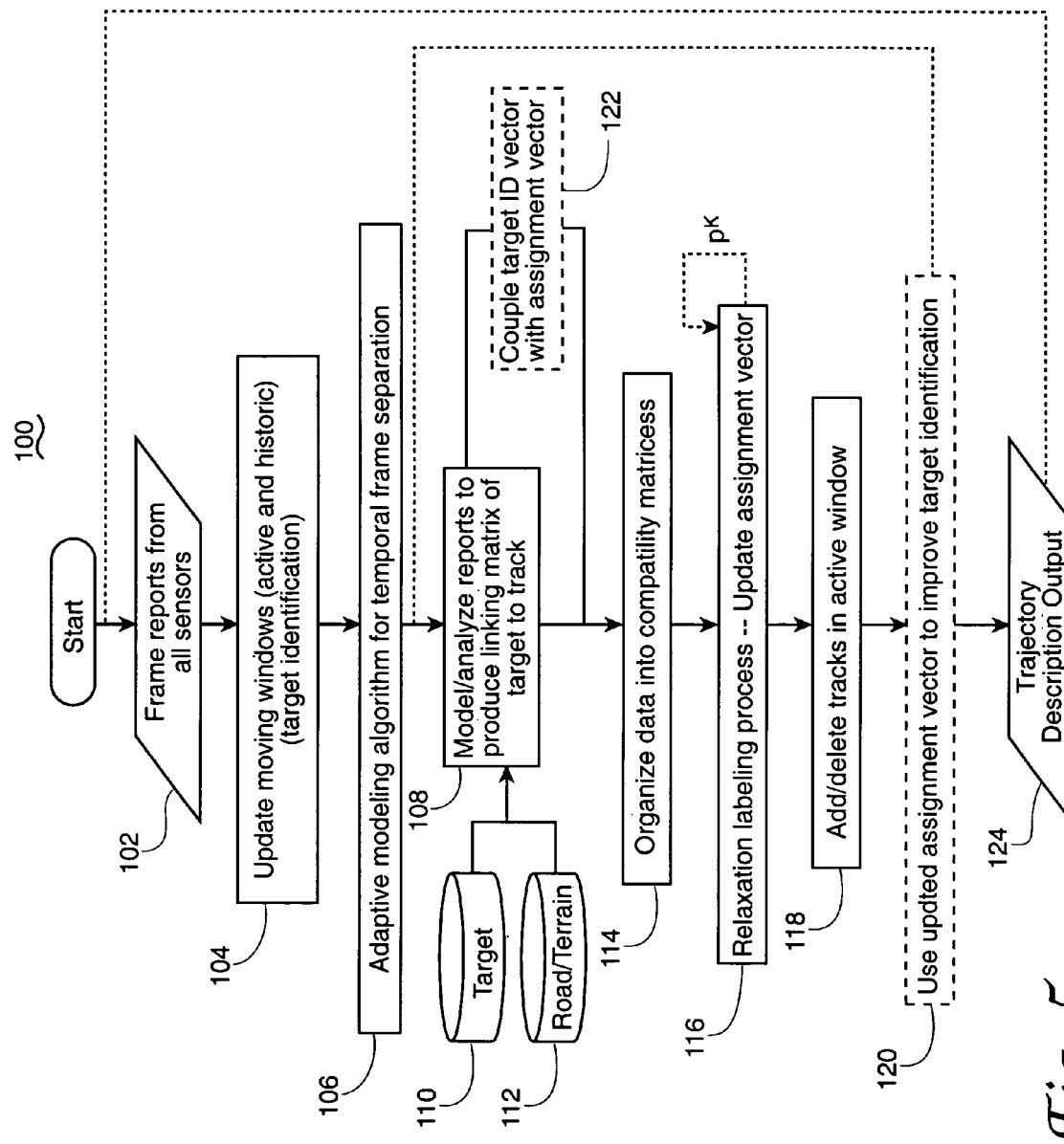
FIG. 5 is a diagram of a tracking procedure for tracking the reports of FIG. 2.

FIG. 5 depicts an illustrative sequence of operations or procedure 100 of an ATR assisted tracking algorithm implemented by the A-Track system 10 described above. The formulations presented above are used to develop symmetric compatibility matrices so that equations for updating assignment vectors are greatly simplified.

One or more sensors provide reports (block 102) that are grouped into a new frame as the moving windows are updated (block 104). The processing algorithm may advantageously adapt to the temporal frame separation (block 106). For instance, certain targets may lend themselves to traditional tracking techniques with small temporal frame separations. Thus, the basic compatibility matrices are modified for the appropriate temporal separation, an example of which is described below with regard to FIG. 6.

Thereafter, the reports for the new frame are modeled and analyzed to product a linking matrix (block 108). The target represented by the report is linked with previous reports assigned to a track. The modeling takes advantage of known constraints, such as from a target database 110 and a road/terrain database 112. Thereby, certain links between reports may be precluded, simplifying the linking.

The linking matrix is then organized and assembled into compatibility matrices (block 114). Then, a relaxation labeling process is performed to update an assignment vector (block 116). Specifically, the compatibility matrices are converted into support functions that are then used to modulate the assignment vector $P^K$. The relaxation labeling loop is an iterative process for optimizing the objective function the local average consistency function A (see equation 3.32).

The results of the assignments may indicate the need for adding or deleting a track in the active window (block 118). Adding a new track may be warranted when an unassigned report remains after all tracks are assigned. A track may be deleted when a criteria is met, such as a certain number of frames are processed without assigning a report to the track or the modeling indicates that the track has departed the surveillance area.

An optional coupling mechanism improving the conditional probability vector by taking a weighted average of the ID vectors ("target vectors") with the assignment vectors (see equation 4.36). The conditional probability vector is improved by communicating the updated assignment vector (block 120) back to block 108 for the next iteration of the process. During which, ID vectors in different frames are linked (block 122). Without this option, the initial conditional probability vector would not change. The optional method for computing a weighted average conditional probability vector, described in Section 4.6 (Advanced Implementation Issues), provides a new approach for coupling the target ID vector derived from ATR analysis with the tracking information in the form of the assignment vector derived from the relaxation labeling algorithm. A weighted average of the ID vector for a fixed trajectory index is taken across multiple frames using the assignment vectors. This coupling is exciting because it allows the ATR and tracking components to influence and improve one another in the iterative relaxation loop. This is a unique feature of A-Track system that uses improved track definition via assignment vectors to improve the conditional probability vector (see equation 4.36) and then uses it to modulate the Compatibility Matrix (see equation 4.37) so as to further improve the assignment vectors. This interaction between ATR and tracking continues in an interactive process. The marriage of ATR and Tracking algorithms was one of the main motivations in the derivation of A-TRACK.

Procedure 100 concludes each iteration with a trajectory description output (block 122) that may be used by user for tracking vehicles and is also fed back for use in the next iteration of the procedure.

Figure 6:
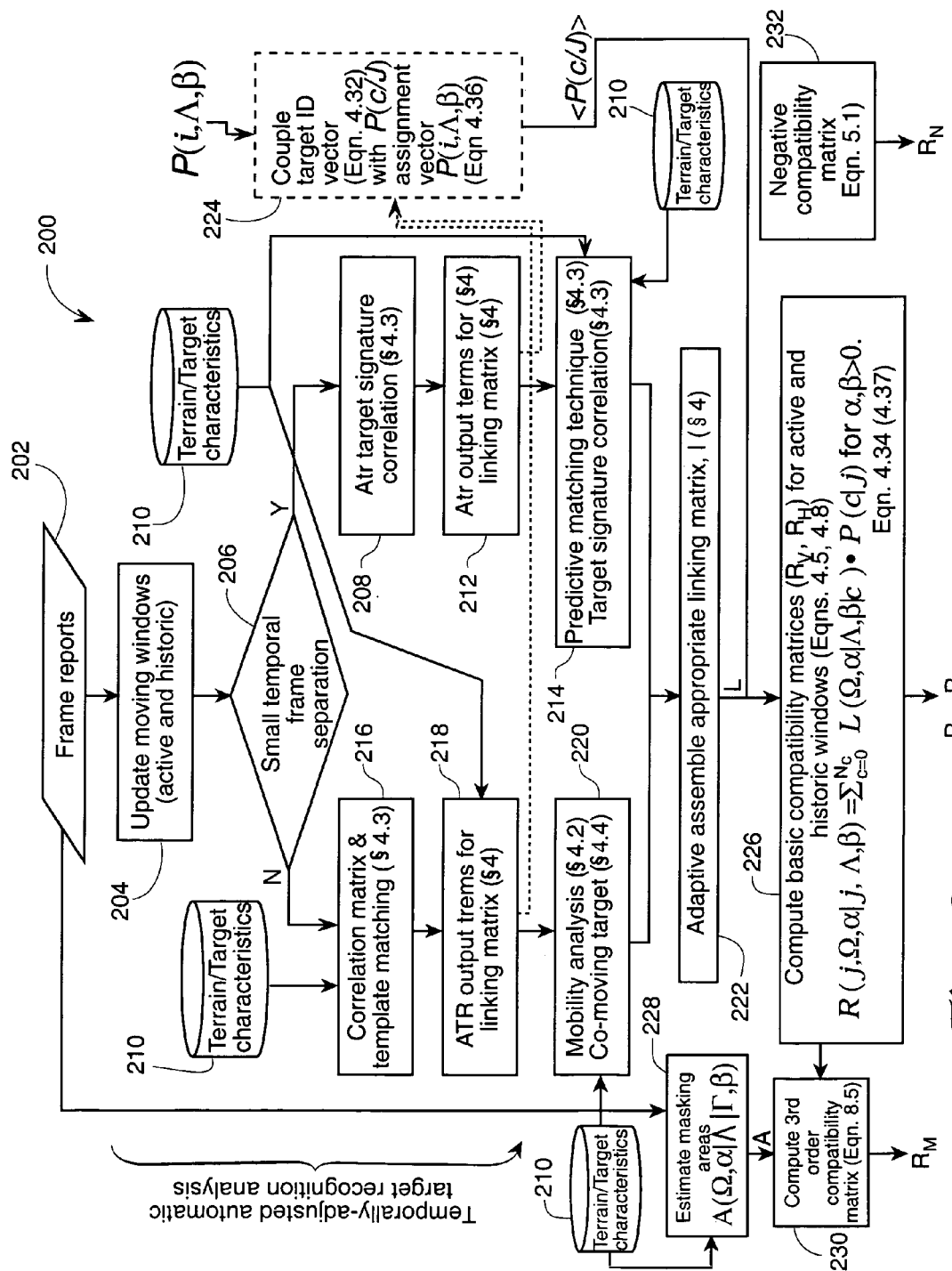
FIGS. 6–7 together form a more detailed implementation of the tracking procedure of FIG. 5.
Figure 7:
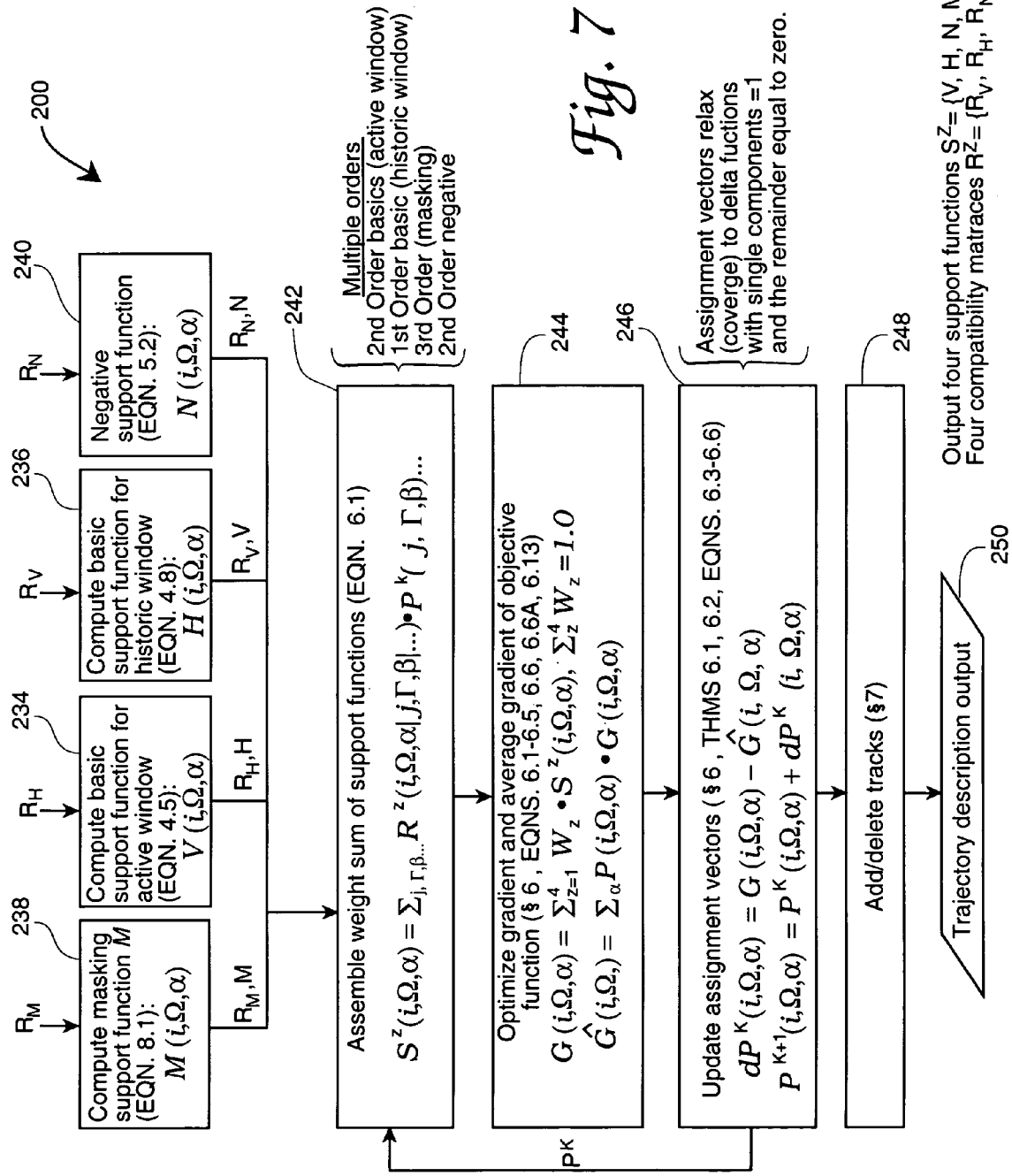

FIGS. 6 and 7 depicts a sequence of operations or procedure 200 that describes a more detailed implementation of an ATR assisted tracking system. In particular, procedure 200 illustrates adapting the basic compatibility matrices to temporal spacing, using a compatibility matrix for masking, using a negative compatibility matrix to avoid ambiguity between reports, and coupling target ID vectors with the assignment vector. In addition, the above-described formulations are cross-referenced to the procedure 200.

Procedure 200 as depicted in FIG. 6 generally describes a process of computing the basic compatibility matrices (blocks 202–226), which tends to be complicated with increased frame temporal spacing.

Each iteration of the procedure 200 begins with receipt of frame reports from one or more sensors (block 202). These sensor inputs include target state vector and target signatures. The moving windows (active and historic) are updated with the frame reports (block 204). Thereafter a determination is made as to whether the temporal frame separation is small (block 206). If small, then ATR target signature correlation is performed (see Sect. 4.3 above) (block 208), referencing predetermined information in a terrain/target characteristics database 210. This prepared database stores digital terrain maps used to estimate the masking areas and has access to navigational data as required to locate positions on the digital map.

The results of which produce ATR output terms for a linking matrix (see Sect. 4) (block 212). In particular, a conditional probability vector P(c|j), where c and j are the class and track indices respectively, are initially defined to be equal to the ID target vector of a specific report to which the new track is anchored in a specific frame (see Eqn. 4.32). The assignment vector for a new track has an invariant label weighting distribution in the anchoring frame (see Eqn. 4.33). This conditional probability vector is used to convert the linking matrix into basic compatibility matrices for the active and historic windows (see Eqn. 4.34), as will be described below with respect to block 226. Predictive matching technique and target signature correlation (see Sect. 4.3) is performed on the ID target vector are then performed (block 214).

If the temporal frame separation was not small in block 206, then a linking matrix is produced taking advantage of information that can still be gleaned through ATR analysis (see Sect. 4.3) (block 216). In particular, ATR analysis may advantageously provide a number of factors (generally multiplicative factors) to enhance the definition of the linking matrix. For instance, the dot product of ID vectors (see Eqns. 4.14–4.17 and related discussion); template matching factors (see Eqns. 4,18–4.19) that also provide some target pose information; and correlation measures between target signatures in two frames (see Eqns. 4.20, 4.22, and 4.23). These ATR analyses advantageously reference terrain/target characteristics database 210 is assist in target identification that can constrain or determine a likelihood of various assignments. Thereby ATR output terms for the linking matrix are produced (see Sect. 4) (block 218), as described above for block 212.

Mobility analysis (see Sect. 4.2) and co-moving target model (see Sect. 4.4) are thereafter performed, thereby advantageously refining the probabilities. Mobility analysis provides a number of factors (generally multiplicative) for defining the linking matrix and factors for predicting masking areas (see Eqns. 8.7, 8.8 and Sect. 8 in general).

With reference to block 224, an optional coupling mechanism improves the conditional probability vector by taking a weighted average of the ID vectors ("target vectors") (See Eqn. 4.32) with the assignment vectors (see Eqn. 4.36). The conditional probability vector is improved by communicating the updated assignment vector from the previous iteration of the process. During which, ID vectors in different frames are linked. Without this option, the initial conditional probability vector would not change. The optional method for computing a weighted average conditional probability vector, described in Section 4.6 (Advanced Implementation Issues), provides a new approach for coupling the target ID vector derived from ATR analysis with the tracking information in the form of the assignment vector derived from the relaxation labeling algorithm. A weighted average of the ID vector for a fixed trajectory index is taken across multiple frames using the assignment vectors. This coupling is exciting because it allows the ATR and tracking components to influence and improve one another in the iterative relaxation loop. This is a unique feature of A-Track system that uses improved track definition via assignment vectors to improve the conditional probability vector (see equation 4.36) and then uses it to modulate the Compatibility Matrix (see equation 4.37) so as to further improve the assignment vectors. This interaction between ATR and tracking continues in an interactive process. The marriage of ATR and Tracking algorithms was one of the main motivations in the derivation of the A-Track system.

After either block 214 or block 218, then the appropriate linking matrix L is adaptively assembled (see Sect. 4) (block 214) with reference to the terrain/target characteristics database 210. The linking matrix L is an efficient way to store the assembled information necessary to compute the compatibility matrices. Then the basic compatibility matrices ($R_V$, $R_H$) for the active and historic windows are formed by taking a weighted average of the linking matrix using the ID vector as shown in Eqns. 4.32, 4.33.

In addition to the basic compatibility matrices $R_V$, $R_H$, FIG. 6 also depicts enhancing the analysis with a predicting masking areas. In particular, the frame reports from block 202 and the terrain/target characteristics database 210 are used in block 228 to estimate masking areas. Then, a third-order compatibility matrix $R_M$ (see Eqn. 8.5) is formed (block 230).

As a further addition to the basic compatibility matrices $R_V$, $R_H$, FIG. 6 also depicts forming a negative compatibility matrix (see Eqn. 5.1) that adds competition between assignment vectors (block 232) to assist in the convergence to a single trajectory description during the relaxation label process.

With particular reference to FIG. 7, the remainder of the procedure 200 is depicted, and in particular the relaxation label algorithm (RLA) process of blocks 238–246. This RLA process begins computing a support function for each compatibility matrix that is the weighted average of the respective compatibility matrix with the assignment vector. These support functions are iteratively optimized in the RLA loop. As the support increases for associating a given track with a given target report, the assignment tends to follow this increase in the support function. In a similar manner, the assignment vector will decrease for associations that have smaller value of the support function. In particular, the masking support function M is computed (see Eqn. 8.1) (block 238). The basic support function V for the active window (see Eqn. 4.5) is computed (block 234). The basic support function H for the historic window is computed (see Eqn. 4.8) (block 236). The negative support function N is computed (see Eqn. 5.2) (block 240).

The objective function to be optimized is formed by averaging the local consistency defined initially in Eqn. 2.11 and re-defined in Eqn. 3.10. (see Eqn. 6.1). If the RLA process is used to optimize the objective function, then a simple formula may be used in terms of the gradient and average gradient of the objective function (see Eqn. 6.1–6.5, 6.6, 6.6A, 6.13) (block 244).

The assignments vectors are updated in block 246 (see Eqns. 6.1, 6.2, 6.3–6.6) with the updated assignment vector fed back to block 242 for recalculating the support functions. The RLA loop of blocks 242–246 may repeat until ideally the assignment vectors relax (converge) to delta functions with a single component equal to 1 and the rest 0 (i.e., the assignment vectors become trajectory description outputs).

When the RLA loop is complete for this iteration of the overall procedure 200, tracks are added or deleted as appropriate (see Sect. 7) (block 248) and then the trajectory description output is provided (block 250).

While the present invention has been illustrated by description of several embodiments and while the illustrative embodiments have been described in considerable detail, it is not the intention of the applicant to restrict or in any way limit the scope of the appended claims to such detail. Additional advantages and modifications may readily appear to those skilled in the art. For example, A-Track is not limited to the HRR application used in this paper to illustrate it. It also provides the basis for modeling other tracking problems utilizing different types of sensors and image analysis problems that need to integrate a complicated suite of constraints. In ATR-driven tracking problems, the full interaction of the dynamics between forming tracks and improving target ID vectors may include continuing to modify the basic compatibility matrix by using a weighted average of the ID vectors is outlined at the end of Section 4.

TABLE 1

Fundamental differences between two tracking applications using different relaxation algorithms.

|  | Lagrangian Relaxation Algorithm | Relaxation Labeling Algorithm (Probabilistic Labeling) |
|---|---|---|
| Variables | Set of complete tracks $Z_{ijk...} \in \{0, 1\}$ binary variables satisfying constraint equations. | Set of weighted labeling assignments $P(i, \Omega, \alpha)$ real functions satisfying probability axioms. |

TABLE 1-continued

Fundamental differences between two tracking applications using different relaxation algorithms.

|  | Lagrangian Relaxation Algorithm | Relaxation Labeling Algorithm (Probabilistic Labeling) |
|---|---|---|
| Prior Knowledge | Set of cost values for each trajectory to incorporate all knowledge. Link all frames in window. | Set of flexible compatibility matrices for incorporating various knowledge aspects. Link small set of frames in window. |
| Objective Function | Total cost to be minimize Linear function of $Z_{ijk...}$ | Average local consistency to be maximized Non-linear function of $P(i, \Omega, \alpha)$ |
| Relaxation Process | Seeks to satisfy constraint equations while minimizing total cost of all trajectories utilized to connect sensor reports. | Modifies $P(i, \Omega, \alpha)$ to maximize objective function defined by compatibility matrices. |
| Constraints Equations | Set of complicating constraint equations to insure precise trajectories | No constraint equations required. |
| Output | Complete and unique set of unambiguous tracks specified by $Z_{ijk...}$ | Set of weighted labeling assignments $P(i, \Omega, \alpha)$ satisfying probability axioms which are ambiguous track descriptors |
| Precision | Precise tracks Non-ambiguous definitions of full set complete tracks. | Fuzzy track descriptions. May result in strictly-ambiguous definitions of track descriptors $P(i, \Omega, \alpha)$. |
| Tolerates Ambiguity | No Incurs complexity to avert ambiguity. | Yes Incurs ambiguity to avert complexity. |
| Object. Relaxed | Set of constraint equations | Set of weighted labeling assignments $P(i, \Omega, \alpha)$ |
| Complexity | HIGH, due to complicate multiple recasting of problem formulation. | LOW, with simple set of updating equations $p^{K+1}(i, \Omega, \alpha) \equiv P^K(i, \Omega, \alpha) + dP^K(i, \Omega, \alpha)$ |
| Special ATR Coupling Mechanisms | None | Factorization of compatibility matrices into linking matrices and ATR dependent conditional probability distribution. |
| Natural feedback to ATR system for dynamic coupling of two systems | Not evident. | Averaged conditional probability distribution $$\langle P(c \mid j) \rangle = \frac{\sum_{\Omega, \alpha} P(j, \Omega, \alpha) \cdot P(c \mid \Omega, \alpha)}{\sum_{\Omega, \alpha} P(j, \Omega, \alpha)}$$ is useful for upgrading both ATRACT and ATR systems and combines variables originating in both systems. |
| Recasting of problem formulation | Required to recast binary partition problem into different forms in order to optimize. | No recasting required. |
| Disambiguation Of relaxation results | Not required if constraint equations are satisfied. | Generally required, but resulting ambiguous assignments may be changed into precise assignments. |

As described in Table 1, above, the generally-known Lagrangian Relaxation Algorithms have several characteristics. First, Basic assignment variable: A binary assignment variable $Z_{ijk...} \in \{0,1\}$ defines a specific trajectory with each index specifying a unique sensor report or missing report for each frame in the moving window. In other words, the existence of a hypothetical possible trajectory consisting of one assignment per frame for every frame is represented by the binary variable $Z_{ijk...}$.

Second, Prior knowledge: All prior knowledge is represented as a score or cost function which associates a cost value $C_{ijk...}$ for every precisely defined trajectory designated by a binary assignment variable $Z_{ijk...}$.

Third, Objective function: Basic objective function is total cost to be minimized, $$\text{Cost} = \sum_i \sum_j \sum_{...} C_{ijk...} \cdot Z_{ijk...}$$

However the binary assignments must satisfy a system of constraints that require that all reports in a given frame be associated with one track only and that each track in a given frame be associated with only one sensor report or missing sensor report. The simultaneous satisfaction of this system of constraints complicates the process of minimizing the basic objective function. This binary partitioning problem could be solved by enumerating all possible assignments to find the optimal assignment satisfying all constraints. However, this rapidly becomes an impractical approach for larger problems because of the vast number of possibilities. Therefore, other optimization techniques are employed such as a Lagrangian relaxation technique which needs to recast the complicated binary partitioning problem into a continuous portioning problem from which a binary solution can ultimately be recovered.

It is the constraint equations that are relaxed by the Lagrangian relaxation algorithm.

Fourth, Outputs: Set of non-zero binary trajectory assignments $Z_{ijk} \ldots \in \{0,1\}$ defining a set of precise trajectories, i.e. each report label assigned to one track and each track assigned to one report label or the missing report label.

By contrast, the inventive Relaxation Labeling Algorithm has a number of characteristics with a number of advantages. First, Basic assignment variable: The basic assignment variables are called the weight label assignments $P(i,\Omega,\alpha)$ which satisfies the probability axioms, $$0 \le P(i, \Omega, \alpha) \le 1 \text{ and } \sum_\alpha P(i, \Omega, \alpha),$$

and specify the relative likelihood that sensor report labels $(\Omega,\alpha)$ being associated with the track object designated by (i) in frame $(\Omega)$. The system of weighted labeling assignments is generally a strictly-ambiguous labeling which does not specify a system of precise trajectories.

Second, Prior knowledge: Different aspects of prior knowledge are represented by a system of varied-ordered compatibility functions linking a finite number of reports in various frames. Different compatibility functions link a report to other reports in the moving active and historic windows. Compatibility matrices are not associated with precise trajectories as are the cost function values. Compatibility matrices represent consistency or compatibility measures for an assignment of a sensor report to one trajectory in one frame with other possible assignments of other sensor reports in other frames. Such measures apply to the construction of the set of all trajectories incorporating these linked sensor report assignments. In other words, individual components of any compatibility matrix are not in one-to-one correspondence with the set of possible trajectories as are the components of the cost function. The system of varied-order compatibility matrices provides an extensive, flexible and varied data structure for incorporating prior knowledge into the problem.

Third, Objective Function: The objective function which is to be maximized is the average local consistency $$A = \sum_{i,\Omega,\alpha} S(i, \Omega, \alpha) \cdot P(i, \Omega, \alpha) =$$

$$\sum_{i,\Omega,\alpha} \sum_{j,\Gamma,\beta} \ldots \sum_Z W_Z \cdot R_Z(i, \Omega, \alpha | j, \Gamma, \beta | \ldots) \cdot P(i, \Omega, \alpha) \cdot P(j, \Gamma, \beta) \ldots A =$$

$$\sum_{i,\Omega,\alpha} P_{i\Omega\alpha} \cdot S_{i\Omega\alpha}$$

which measures the compliance of the real valued non-binary weighted labeling assignments $P(i,\Omega,\alpha)$ with the consistency conditions represented by the system of compatibility matrices. The resultant $S(i,\Omega,\alpha)$ support function is not a cost function analogous to $C_{ijk} \ldots$ but averages over the system of compatibility matrices with the weighted labeling assignments, $P(i,\Omega,\alpha)$. Actually A is a nonlinear function of the weighted labeling assignments. Note that there is no system of constraints to complicate the relaxation labeling processes.

Fourth, once the system of compatibility matrices is formulated to include prior knowledge, simple updating formulae of the relaxation labeling algorithm may be utilized without any need to recast the problem to facilitate relaxation the relaxation process. Therefore, the relaxation labeling updating equations are invariant. This is in sharp contrast to the complicating necessity of the Lagrangian relaxation techniques to transform the problem into continuous sub-problems to effect optimization. Also, simple conditions on formulating the system of compatibility matrices result in very simple updating equations that insure non-negative changes to the objective function A and also guarantee the invariance of probability axioms, $$0 \le P^{K+1}(i,\Omega,\alpha) = P^K(i,\Omega,\alpha) + dP^K(i,\Omega,\alpha) \le 1.0$$

It is the values of the weighted labeling assignments that are relaxed by the simpler relaxation labeling algorithm. There is a significant difference between relaxing a set of values for $P(i,\Omega,\alpha)$ with a simple set of updating equations and relaxing a set of constraint equations necessitating a recasting of the problem formulation.

Fifth, Outputs: The real valued weighted labeling assignments $P(i,\Omega,\alpha)$ which may or may not achieve a binary set of values necessary to define precise trajectories, i.e. $P(i,\Omega,\alpha) \in \{0,1\}$ and $$\sum_\alpha P(i, \Omega, \alpha) = 1.0.$$

In general, under the simple relaxation labeling technique, the weighted labeling assignments should approach close enough to this ideal to be useful without change or to be easily adjusted to make them unambiguous.

Fifth, Coupling with ATR systems: Note that the formulation of the system of compatibility matrices provides facility for dynamically coupling the relaxation labeling processing and the ATR processing. This is why the ATR in ATRACK refers to Automatic Target Recognition and the TRACK refers to tracking. A cost function may incorporate inputs from an ATR system but all ATR information pertaining to a track is factored into a single value of cost. In ATRACK, ATR information is factored into compatibility matrices which link a small set of frames and not associated with a trajectory which links all frames in a moving window. Most basic compatibility matrices are second order linking two reports in two frames not necessarily sequential or adjacent frames.

ATRACK deals with fuzzy track objects because in every frame in the active window each report may be associated with different weights with all trajectory indices and in each frame each trajectory object (index) may be associated with all reports and/or even labeled with the missing report symbol. The weighted labeling assignments $P(i,\Omega,\alpha)$ give the relative probability or weight of associating report a in frame $\Omega$ with track object i. The compatibility matrices give a consistency measure between two or more assignments and provide the means for incorporating prior knowledge into the relaxation labeling approach. Different compatibility matrices can be conveniently used to incorporate different aspects of prior knowledge including information provided by an ATR system. Factoring the compatibility matrices into linking matrices and ATR dependent conditional probability distributions further facilitates the inclusion of ATR information. ATR information may also be incorporated into the linking matrices which are not associated with track objects. In ATRACK the conditional probability distribution is a report linking entity that factors into $P(i,\Omega,\alpha)$ weighted averages of the identification vector $P(c|\Omega,\alpha)$ and is therefore useful feedback data for the ATR systems updating of subsequent identification vectors for ATRCK to use in updating the conditional probability distribution.

In Poore's approach everything is factored into one cost value for each possible non-ambiguous trajectory. Further more it is not evident how to establish a two way dynamic coupling between the Lagrangian relaxation process and the ATR updating process. If trajectory cost values are updated with new ATR information the constraint equations are not changed; therefore, the solution state must be checked for feasibility and adjust to the new values of the cost function. The interesting question is how does the Lagrangian relaxation process provide intermediate solution states as useful feedback to the ATR processing module in order to affect a two way dynamic coupling process. The answer to this question is not discussed by Poore nor is evident how to duplicate ATRACK's dynamic coupling potential in which the optimization of both ATR and track descriptors mutually assist one another iteratively Superficial similarities exist between generally-known RLA and the inventive LRA due to nature of basic data formats for sensor outputs. First, sensor reports are the natural outputs of sensors. In ATRACT sensor reports also include data from an automatic target recognition (ATR) system which also processes the initial sensor reports.

Second, sensors generally make scans resulting in spatially and temporally related reports. This naturally related group of sensor reports is called a frame. Even if sensor reports were gathered in a completely random and unsystematic manner, it would be natural to arrange observed sensor reports into this quantized format.

Third, adjacent frames are also grouped and processed as active sets which naturally defines a temporally moving window of active frames as older frames are fixed and new frames acquired as active input. One could possibly work with an expanding window of frames but this would soon become untenable with a continuous inflow of sensor reports. The number of frames per active window is not generally a hard requirement but usually adopted as a convenient simplification.

Fourth, therefore, these natural data groupings would be hard to avoid in any tracking problem definition which attempts to temporally link sensor reports initiated by the same sensed object. Utilization of these data structures does not limit the countless ways to incorporate prior knowledge, establish objectives influencing the track definitions, methods for optimizing selected objective function, and the type of solution achieved by the adopted processing technique.

As a further example, it will be appreciated that the RLA loop advantageously allows a simple approach to optimizing the objective function by optimizing the gradient and average of the gradient of the objective function. However, other optimization approaches may be employed.

The invention claimed is:

1. A method of determining trajectories of a plurality of periodically sensed targets, comprising:
periodically accepting a plurality of target sensor reports $(\alpha, \beta, \chi, \ldots)$;
grouping temporally related subsets of the plurality of target sensor reports into a plurality a sequential frames $(\Omega, \Gamma, \ldots)$;
establishing a system of track objects $(i, j, k, \ldots)$ associated with the plurality of target sensor reports in a previous frame;
linking each target sensor report $(\alpha)$ in the current frame to each of one or more track objects $\{i, j, \ldots\}$ in a previous frame $(\Omega)$ by a weighted labeling assignment $(P(i, \Omega, \alpha))$;
defining a plurality (M) of compatibility matrices $(R_Z(i, \Omega, \alpha|j, \Gamma, \beta| \ldots))$ wherein $Z=1,2,\ldots,M$) each operatively configured to measure selected relative compatibilities and consistencies of a set of sensor reports labels identified by $\{(\Omega, \alpha), (\Gamma, \beta), \ldots\}$ being assigned to the set of track objects identified by $\{i, j, \ldots\}$;
generating a system of support functions $S_z(i, \Omega, \alpha)$ from said system of varied-ordered compatibility matrices $(R_z)$ by computing weighted averages of each compatibility matrix $(R_z)$ with said weighted labeling assignments, $$\left(S_z(i, \Omega, \alpha) = \sum_{j,\Gamma,\beta} \ldots R_z(i, \Omega, \alpha|j, \Gamma, \beta|\ldots) \cdot P(j, \Gamma, \beta) \ldots \right)$$

generating a resultant support function $[S(i,\Omega,\alpha)]$ by combining said system of support functions $S_z(i,\Omega,\alpha)$;
iteratively modifying said weighted labeling assignments $(P(i,\Omega,\alpha))$ with a relaxation labeling technique that maximizes an average local consistency $$\left(A = \sum_{i,\Omega,\alpha} P(i, \Omega, \alpha) \cdot S(i, \Omega, \alpha)\right)$$

which measures compliance of said weighted labeling assignments with said consistency conditions represented by said system of compatibility matrices;
generating trajectory descriptors of periodically sensed targets using said weighted labeling assignments.

2. The method of claim 1, wherein defining the plurality (M) of compatibility matrices $(R_z(i, \Omega, \alpha|j, \Gamma, \beta| \ldots)$ where $Z=1,2\ldots,M$) iteratively modifying said weighted labeling assignments $P(i, \Omega, \alpha)$ with the relaxation labeling technique that maximizes an average local consistency further comprises:
formulating said system of varied-ordered compatibility matrices having symmetric structure and complying with conditions $-1.0 \leq L^Z_{MIN} \leq R_Z(i,\Omega,\alpha|j,\Gamma,\beta \ldots) \leq L^Z_{MAX} \leq 1.0$ for all $Z,i,\Omega,\alpha,j,\Gamma,\beta,\ldots$, where $L^Z_{MAX} - L^Z_{MIN} \leq 1.0$ and $Z=1,2,\ldots,M$;
initializing said weighted labeling assignments to satisfy probability axioms; i.e., $0 \leq P(i,\Omega,\alpha) \leq 1.0$ and $$\sum_\alpha P(i, \Omega, \alpha) = 1.0;$$

generating said resultant support function by combining said system of support functions by weighted average; i.e., $$S^K(i, \Omega, \alpha) \equiv \sum_Z W_Z \cdot S_Z^K(i, \Omega, \alpha),$$

where $W_Z$ satisfies said probability axioms and K=iteration index;

generating averages of said resultant support function, $$\hat{S}^K(i, \Omega) \equiv \sum_\alpha S^K(i, \Omega, \alpha) \cdot P^K(i, \Omega, \alpha);$$

generating modifications to said weighted labeling assignments with said relaxation labeling technique defined by $dP^K(i,\Omega,\alpha) = P^K(i,\Omega,\alpha) \cdot (G^K(i,\Omega,\alpha) - \hat{G}^K(i,\Omega))$ $$G^K(i, \Omega, \alpha) = \frac{\partial A}{\partial P^K(i, \Omega, \alpha)} \cdot \frac{1}{\sum_Z W_Z \cdot O_Z} = \sum_Z V_Z \cdot S_Z^K(i, \Omega, \alpha),$$

$$\hat{G}^K(i, \Omega) = \sum_\alpha P^K(i, \Omega, \alpha) \cdot G^K(i, \Omega, \alpha),$$

where $$V_Z = \frac{W_Z \cdot O_Z}{\sum_Z W_Z \cdot O_Z} \text{ and } O_z = \text{Order of } R_Z;$$

updating said weighted labeling assignments with said modifications $dP^K(i,\Omega,\alpha)$ which automatically preserves said initialing probability axioms; i.e., $0 \leq P^{K+1}(i,\Omega,\alpha) = P^K(i,\Omega,\alpha) + dP^K(i,\Omega,\alpha) \leq 1.0$ and $$\sum_\alpha P^{K+1}(i, \Omega, \alpha) = 1.0,$$

and automatically insures non-negative changes to said average local consistency measure; i.e., $$A = \sum_{i,\Omega,\alpha} S^K(i, \Omega, \alpha) \cdot P^K(i, \Omega, \alpha)$$

$$= \sum_{i,\Omega,\alpha} \sum_{j,\Gamma,\beta} \ldots \sum_Z W_Z \cdot R_Z(i, \Omega, \alpha|j, \Gamma, \beta|\ldots) \cdot P^K(i, \Omega, \alpha) \cdot P^K(j, \Gamma, \beta) \ldots ,$$

$$dA \sum_{i,\Omega,\alpha} \frac{\partial A}{\partial P^K(i, \Omega, \alpha)} \cdot dP^K(i, \Omega, \alpha) \geq 0.0.$$

3. The method of claim 1, wherein linking each report in the frame to one or more tracks in a previous frame further comprises performing automatic target recognition analysis to generate a probability of assignment for each report.

4. The method of claim 1, wherein linking each report in the frame to one or more tracks in a previous frame further comprises performing automatic target recognition analysis to generate a probability of assignment for each report.

5. The method of claim 4, wherein performing automatic target recognition analysis comprises performing target signature correlation.

6. The method of claim 4, wherein performing automatic target recognition analysis comprises performing predictive matching.

7. The method of claim 4, wherein performing automatic target recognition analysis comprises performing mobility analysis with reference to a characteristics database.

8. The method of claim 4, wherein performing automatic target recognition analysis comprises performing co-moving target analysis with reference to a characteristics database.

9. The method of claim 1, wherein linking each report in the frame to one or more tracks in a previous frame further comprises estimating masking areas with reference to a terrain database and computing a compatibility matrix for the estimated masking areas.

10. The method of claim 1, wherein converting the linking matrix into the plurality of compatibility matrices further comprises computing a negative compatibility matrix for encouraging competition between assignment vectors to a given report.

11. The method of claim 1, wherein converting the linking matrix into the plurality of compatibility matrices further comprises coupling a target identification vector with the assignment vector.

12. The method of claim 1, wherein defining said system of varied-ordered compatibility matrices to incorporate knowledge of consistency conditions influencing labeling of said track objects further comprises:
  accepting inputs from an automatic target recognition (ATR) system; and
  defining a system of varied-ordered compatibility matrices incorporating said ATR system inputs.

13. The method of claim 12, wherein forming said system of compatibility matrices combining inputs from said automatic target recognition (ATR) system further comprises:
  establishing a system of varied-ordered lining matrices independent of said track objects;
  combining said varied-ordered linking matrices with said inputs from said ATR system forming a corresponding subsystem of said varied-ordered ATR dependent compatibility matrices.

14. The method of claim 13, wherein establishing a system of varied-ordered linking matrices further comprises:
  defining a system of varied-ordered linking matrices incorporating selected aspects of prior knowledge with respect to relative consistency of linking said sensor reports for target classes identifiable by class index c; and
  combining said system of varied-order linking matrices into a system of resultant linking matrices, where $L_N(\Omega,\alpha|\Lambda,\beta| \ldots |c)$ identifies said resultant linking matrix for order N and target class c.

15. The method of claim 13, wherein generating said system of varied-ordered compatibility matrices by combining said system of linking matrices with said automatic target recognition (ATR) system inputs further comprises:
  accepting said ATR system inputs;
  formulating with said ATR system inputs a conditional probability distribution designated by P(c|j);
  convert said resultant linking matrix of varied-order N into said AIR dependent compatibility matrix of varied-order N utilizing said conditional probability distribution, $$R_N(j, \Omega, \alpha|j, \Lambda, \beta|\ldots) \equiv \sum_c L_N(\Omega, \alpha|\Lambda, \beta|\ldots|c) \cdot P(c|j).$$

16. The method of claim 15, wherein accepting said automatic target recognition (ATR) system inputs and formulating said conditional probability distribution further comprises:
accepting as part of said ATR system inputs an ATR system included identification vector designated by P(c|Ω,α); and
defining averaged conditional probability distributions identifiable with <P(c|j)> by taking averages of said identification vector P(c|Ω,α) with said weighting labeling assignments P(i,Ω,α).

17. The method of claim 13, wherein generating said system of varied-ordered compatibility matrices by combining said system of varied-ordered linking matrices with said automatic target recognition (ATR) system inputs further comprises:
periodically updating said averaged conditional probability distributions combining iterative enhancements to said weighting labeling assignments resulting from said relaxation labeling processing with periodic ATR generated enhancements to said ATR system inputs; and
applying said enhanced averaged conditional probability distributions to updating said system of AIR dependent varied-ordered compatibility matrices.

18. The method of claim 13, wherein generating said system of varied-ordered compatibility matrices by combining said system of varied-ordered linking matrices with said automatic target recognition (ATR) system inputs further comprises:
storing said varied-ordered linking matrices instead of said dependent compatibility matrices resulting in reduced storage requirements; and
computing said support functions utilizing corresponding said stored linking matrices.

19. The method of claim 12, wherein accepting said inputs from said automatic target recognition (ATR) system and defining said system of varied-ordered compatibility matrices incorporating said ATR inputs further comprises performing automatic target recognition analysis to generate relative measures for linking two or more said sensor reports.

20. The method of claim 19, wherein performing automatic target recognition analysis further comprises performing target signature correlation.

21. The method of claim 19, wherein performing automatic target recognition analysis further comprises performing predictive matching.

22. The method of claim 19, wherein performing automatic target recognition analysis further comprises performing mobility analysis with reference to a characteristics database.

23. The method of claim 19, wherein performing automatic target recognition analysis further comprises performing co-moving target analysis with reference to a characteristics database.

24. The method of claim 1, wherein generating trajectory descriptors of periodically sensed targets using said weighted labeling assignments modified with said relaxation labeling technique and outputting said determined trajectories descriptors further comprises:
accepting inputs from an automatic target recognition (ATR) system to enhance said trajectory descriptors; and
outputting said trajectories descriptors including said updated averaged conditional probability distributions to said ATR system for enhancing subsequent ATR generated inputs, thus coupling said ATR system processing and said relation labeling processing and reciprocally enhancing results from both processing systems.

25. The method of claim 1, wherein defining higher order compatibility matrices further comprises estimating marking areas with reference to a characteristics database to account for consistency of said sensor and missing sensor reports and computing a compatibility matrix for said estimated masking areas.

26. The method of claim 1, wherein defining higher order compatibility matrices further comprises constructing compatibility matrices combining other said compatibility matrices of lower-order as defining components.

27. The method of claim 1, wherein defining said system of varied-order compatibility matrices further comprises adjusting maximum separation between frames linked by said system of multi-ordered compatibility matrices.

28. The method of claim 1, wherein iteratively modifying said weighted labeling assignments with said relaxation labeling technique further comprises:
restricting said iterative modification of said weighted labeling assignments to a set of active components of said weighted labeling assignments associated with a temporally changing set of active frames designated as an active window;
restricting said iterative modification of said weighted labeling assignments in inactive frames outside said active window referred to as an inactive window.

29. The method of claim 1, wherein defining said system of varied-order compatibility matrices further comprises redefining a set of said compatibility matrices connecting frames in both said active and inactive windows as a set of reduced compatibility matrices having reduced order equaling number of said active frames connected.

30. The method of claim 1, wherein generating a system of support functions from said system of varied-ordered compatibility matrices further comprises:
maintaining inactive components of said weighted labeling assignments associated with said inactive window for use in generating support functions; and
computing support functions from said set of reduced multi-order compatibility matrices for defining said resultant support function use by said relaxation labeling processing in said active window.

31. The method of claim 1, wherein establishing system of track objects dryer comprises methods for initiating said track objects consistent with said sensor reports.

32. The method of claim 1, wherein establishing said system of tracking objects further comprises methods for removal of said track objects no longer consistent with said sensor reports.

33. The method of claim 1, wherein defining said system of compatibility matrices further comprises initializing new components of said compatibility matrices associated with said initializing of track objects.

34. The method of claim 1, wherein defining said system of compatibility matrices further comprises initializing values for said compatibility matrix components associated with said missing sensor report labels.

35. The method of claim 1, wherein defining weighted labeling assignments further comprises initializing weighted labeling assignments associated with said initializing of new components of said compatibility matrices.

36. The method of claim 1, wherein defining said system of compatibility matrices further comprises dynamically altering a number of varied-ordered compatibility matrices defining said resultant support function.

37. The method of claim 1, wherein defining said system of varied-ordered compatibility matrices further comprises dynamically altering definitions and orders of said compatibility matrices defining said resultant support function.

38. The method of claim 1, wherein fixing values of said weighted labeling assignments to determine said trajectories further comprises adjusting said fixed values to selected track-defining levels of precision ranging from allowing strictly ambiguous values for fuzzy trajectory definition to a set of binary values for precise unambiguous trajectory definition depending on requirements of said external application modules utilizing said trajectory definitions as input.

39. An apparatus, comprising: a memory; a plurality of target sensor reports ($\alpha$, $\beta$, $\chi$, ...) resident in the memory; and a program resident in the memory, the program configured (a) to group temporally related subsets of the plurality of target sensor reports into a plurality a sequential frames ($\Omega$, $\Gamma$, ...); (b) to establish a system of track objects (i, j, k, ...) associated with the plurality of target sensor reports in a previous frame; (c) to link each target sensor report (c) in the current frame to each of one or more track objects (i) in a previous frame ($\Omega$) by a weighted labeling assignment P(i, $\Omega$, $\alpha$)): (d) to define a plurality (M) of compatibility matrices ($R_Z$(i, $\Omega$, $\alpha$|j, $\Gamma$, $\beta$| ...) where Z=1,2, ... ,M) operatively configured to measure selected relative compatibilities and consistencies of a set of sensor reports labels identified by {($\Omega$, $\alpha$), ($\Gamma$, $\beta$), ...} being assigned to a set of track objects identified by {i, j, ...}; (e) to generate a system of support functions $S_Z$(i, $\Omega$, $\alpha$) from said system of varied-ordered compatibility matrices ($R_Z$) by computing weighted averages of each compatibility matrix ($R_Z$) with said weighted labeling assignments.

$$\left( S_z(i, \Omega, \alpha) = \sum_{j,\Gamma,\beta} \ldots R_z(i, \Omega, \alpha|j, \Gamma, \beta|\ldots) \cdot P(j, \Gamma, \beta) \ldots \right)$$

generating a resultant support function (S(i,$\Omega$,$\alpha$)) by combining said system of support functions $S_Z$(i,$\Omega$,$\alpha$); (f) to iteratively modify said weighted labeling assignments (P(i, $\Omega$, $\alpha$)) with a relaxation labeling technique that maximizes an average local consistency $$\left( A = \sum_{i,\Omega,\alpha} P(i, \Omega, \alpha) \cdot S(i, \Omega, \alpha) \right)$$

which measures compliance of said weighted labeling assignments with said consistency conditions represented by said system of compatibility matrices; and (g) to generate trajectory descriptors of periodically sensed targets using said weighted labeling assignments.

40. A program product, comprising: (a) a program configured to (a) to group temporally related subsets of a plurality of target sensor reports into a plurality a sequential frames ($\Omega$, $\Gamma$, ...); (b) to establish a system of track objects (i, j, k, ...) associated with the plurality of target sensor reports in a previous frame; (c) to link each target sensor report ($\alpha$) in the current frame to each of one or more track objects (i) in a previous frame ($\Omega$) by a weighted labeling assignment (P(i, $\Omega$, $\alpha$)); (d) to define a plurality (M) of compatibility matrices ($R_Z$(i, $\Omega$, $\alpha$|j, $\Gamma$, $\beta$, ...) where Z=1, 2, ... ,M) operatively configured to measure selected relative compatibilities and consistencies of a set of sensor reports labels identified by {($\Omega$, $\alpha$), ($\Gamma$, $\beta$), ...} being assigned to a set of track objects identified by {i, j, ...}; (e) to generate a system of support functions $S_Z$(i, $\Omega$, $\alpha$) from said system of varied-ordered compatibility matrices ($R_Z$) by computing weighted averages of each compatibility matrix ($R_Z$) with said weighted label assignments, $$\left( S_z(i, \Omega, \alpha) = \sum_{j,\Gamma,\beta} \ldots R_z(i, \Omega, \alpha|j, \Gamma, \beta|\ldots) \cdot P(j, \Gamma, \beta) \ldots \right)$$

generating a resultant support function (S(i,$\Omega$,$\alpha$)) by combining said system of support functions $S_Z$(i,$\Omega$,$\alpha$); (f) to iteratively modify said weighted labeling assignments (P(i, $\Omega$,$\alpha$)) with a relaxation labeling technique that maximizes an average local consistency $$\left( A = \sum_{i,\Omega,\alpha} P(i, \Omega, \alpha) \cdot S(i, \Omega, \alpha) \right)$$

which measures compliance of said weighted labeling assignments with said consistency conditions represented by said system of compatibility matrices; and (g) to generate trajectory descriptors of periodically sensed targets using said weighted labeling assignments; and (b) a signal bearing media bearing the program.

41. The program product of claim 40, wherein the signal bearing media comprises at least one of a recordable media and a transmission-type media.

\* \* \* \* \*